United States Patent
Barasch

(10) Patent No.: US 11,489,683 B2
(45) Date of Patent: Nov. 1, 2022

(54) SYSTEM AND METHOD OF DATING THROUGH VIDEO PROFILES

(71) Applicant: Michael Barasch, Valley Village, CA (US)

(72) Inventor: Michael Barasch, Valley Village, CA (US)

(*) Notice: Subject to any disclaimer, the term of this patent is extended or adjusted under 35 U.S.C. 154(b) by 0 days.

(21) Appl. No.: 17/379,975

(22) Filed: Jul. 19, 2021

(65) Prior Publication Data
US 2022/0191053 A1    Jun. 16, 2022

Related U.S. Application Data

(60) Provisional application No. 63/026,918, filed on May 19, 2020.

(51) Int. Cl.
| | |
|---|---|
| H04L 12/18 | (2006.01) |
| G06F 16/735 | (2019.01) |
| G06F 16/74 | (2019.01) |
| G06F 16/535 | (2019.01) |
| G06F 16/54 | (2019.01) |

(52) U.S. Cl.
CPC ........ *H04L 12/1818* (2013.01); *G06F 16/535* (2019.01); *G06F 16/54* (2019.01); *G06F 16/735* (2019.01); *G06F 16/74* (2019.01); *H04L 12/1822* (2013.01)

(58) Field of Classification Search
CPC . H04L 51/222; H04L 51/216; H04L 12/1818; H04L 12/1822; G06F 16/71; G06F 16/535; G06F 16/54; G06F 16/735; G06F 16/74; G06Q 10/107
See application file for complete search history.

(56) References Cited

U.S. PATENT DOCUMENTS

| | | | | |
|---|---|---|---|---|
| 2011/0252340 | A1* | 10/2011 | Thomas | G06Q 10/107 715/756 |
| 2014/0040368 | A1* | 2/2014 | Janssens | H04L 67/306 709/204 |
| 2015/0067070 | A1* | 3/2015 | Jacques | G06Q 30/0269 709/206 |
| 2015/0100422 | A1* | 4/2015 | Quisel | G06Q 30/0256 705/14.54 |
| 2015/0213091 | A1* | 7/2015 | Laight | H04L 51/222 707/758 |
| 2016/0366242 | A1* | 12/2016 | Oh | H04L 67/306 |
| 2018/0048599 | A1* | 2/2018 | Arghandiwal | H04L 51/216 |
| 2018/0189392 | A1* | 7/2018 | Sayman | G06F 16/71 |
| 2020/0403956 | A1* | 12/2020 | Adamski | G06F 3/14 |

* cited by examiner

*Primary Examiner* — Jungwon Chang

(57) ABSTRACT

A system and a method of dating through video profiles are a dating platform that serves as a secure and accurate online dating application. The system used to implement the method includes a remote server and personal computing (PC) device. A plurality of user accounts is managed by the at least one remote server. The method begins by tracking a current location of the corresponding PC device of each user account with the remote server. Each user account is prompted to view an introduction video of at least one desired account with the corresponding PC device. The introduction video is outputted for viewing. The arbitrary account is then prompted to send a video-viewing request to the desired account. The desired account is prompted to accept the video-viewing request, and the introduction video is outputted for the desired account. A scheduling process is then executed for at least one live meeting.

12 Claims, 23 Drawing Sheets

SYSTEM AND METHOD OF DATING THROUGH VIDEO PROFILES

The current application claims a priority to the U.S. provisional patent application Ser. No. 63/026,918 filed on May 19, 2020. The U.S. provisional patent application 63/026,918 is revived within the two-month period for unintentional abandonment by Jul. 19, 2021.

FIELD OF THE INVENTION

The present invention generally relates to online dating. More specifically, the present invention is a method of dating through video profiles.

BACKGROUND OF THE INVENTION

The present invention digitizes human chemistry by humanizing dating applications. The present invention creates a safe and secure environment that is more like meeting in person. The application of the present invention is a completely visual application that requires no written information about the users. The application provides a platform to store a profile picture as well as an introduction video of the user. The introduction video is 5 to 45 seconds long and provides a novel method for users to present themselves. Users can browse potential dates by looking at the profile pictures of other users shown in a photo gallery. The photo gallery displays various potential dates the user can choose from. The user just taps on the desired photograph of the potential date, which in turn plays the introduction video of the selected user.

If the user likes the introduction video, the user can send the selected user an invitation to watch their introduction video. The invited user can then view the invitation and watch the video invitation of the inviting user. The invited user can choose various options from a menu which include scheduling a face date, setting up a face date or voice date right then, or declining the invitation. The inviting user is notified if the invited user has scheduled a face date or is requesting a face date or voice date right then. The inviting user is then able to accept the date or reschedule the date if necessary. The rescheduling process can be repeated as many times as necessary until both users agree on a date and time. The present invention administers the scheduled dates and can remind the users of upcoming dates. The users can also reschedule the date at any time before the date.

Furthermore, the face date and voice date are both completely private and secure, with no private information being exchanged between users.

DETAIL DESCRIPTIONS OF THE INVENTION

All illustrations of the drawings are for the purpose of describing selected versions of the present invention and are not intended to limit the scope of the present invention.

Figure 1:
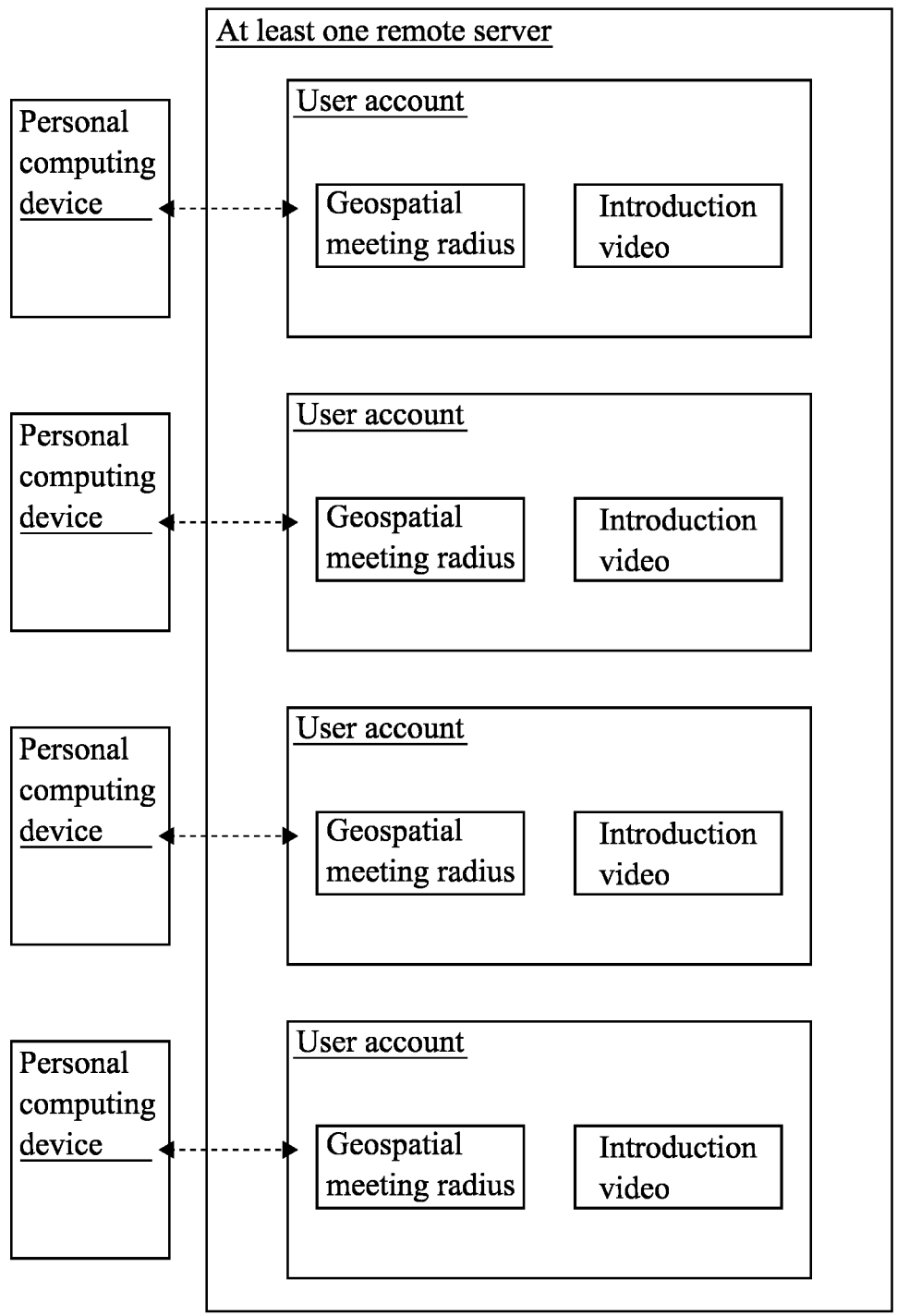
FIG. 1 is a block diagram illustrating a system used to implement a method of the present invention.
Figure 2:
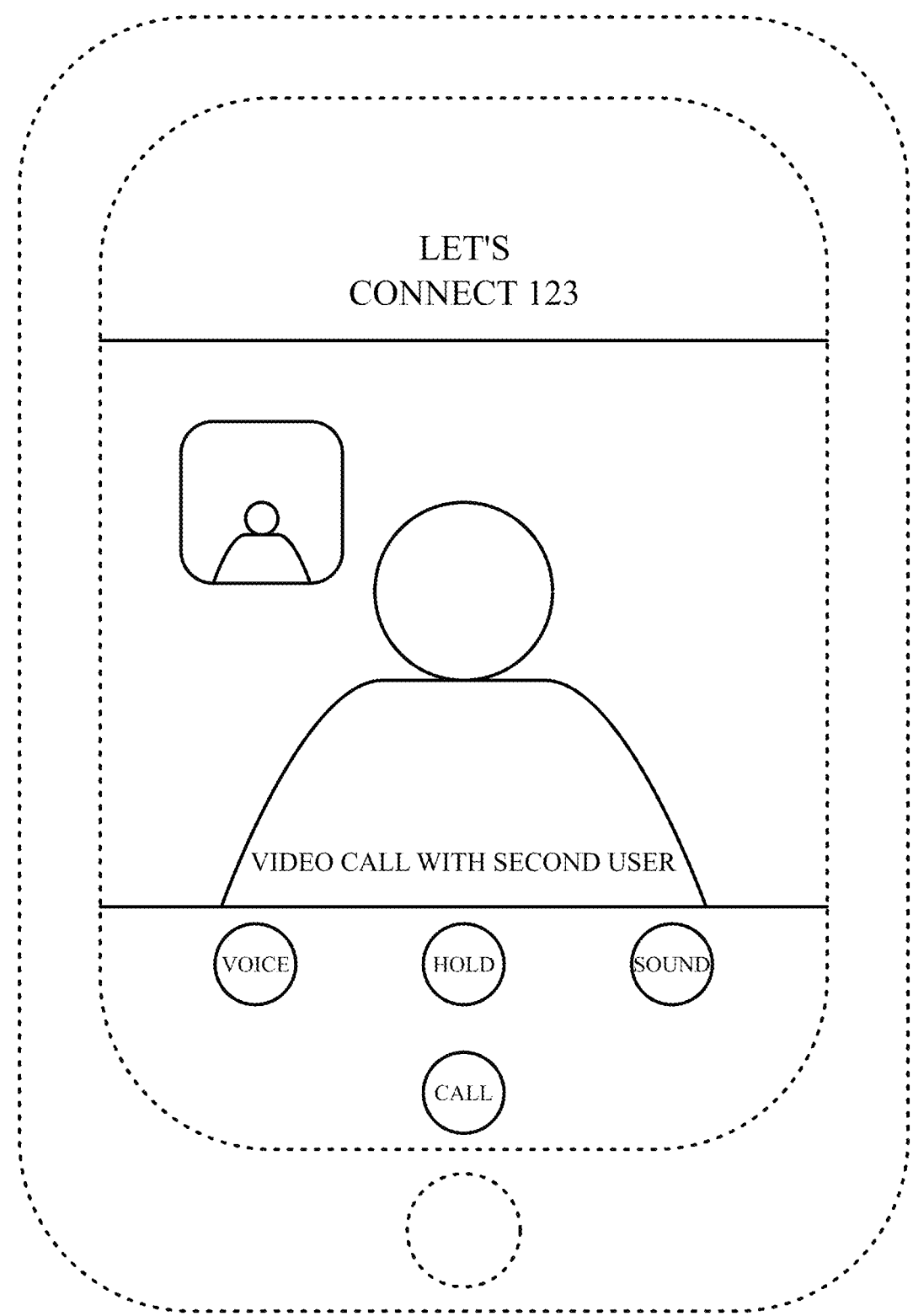
FIG. 2 is a schematic view for displaying a video date with a screen of a personal computing device for the present invention.
Figure 10:
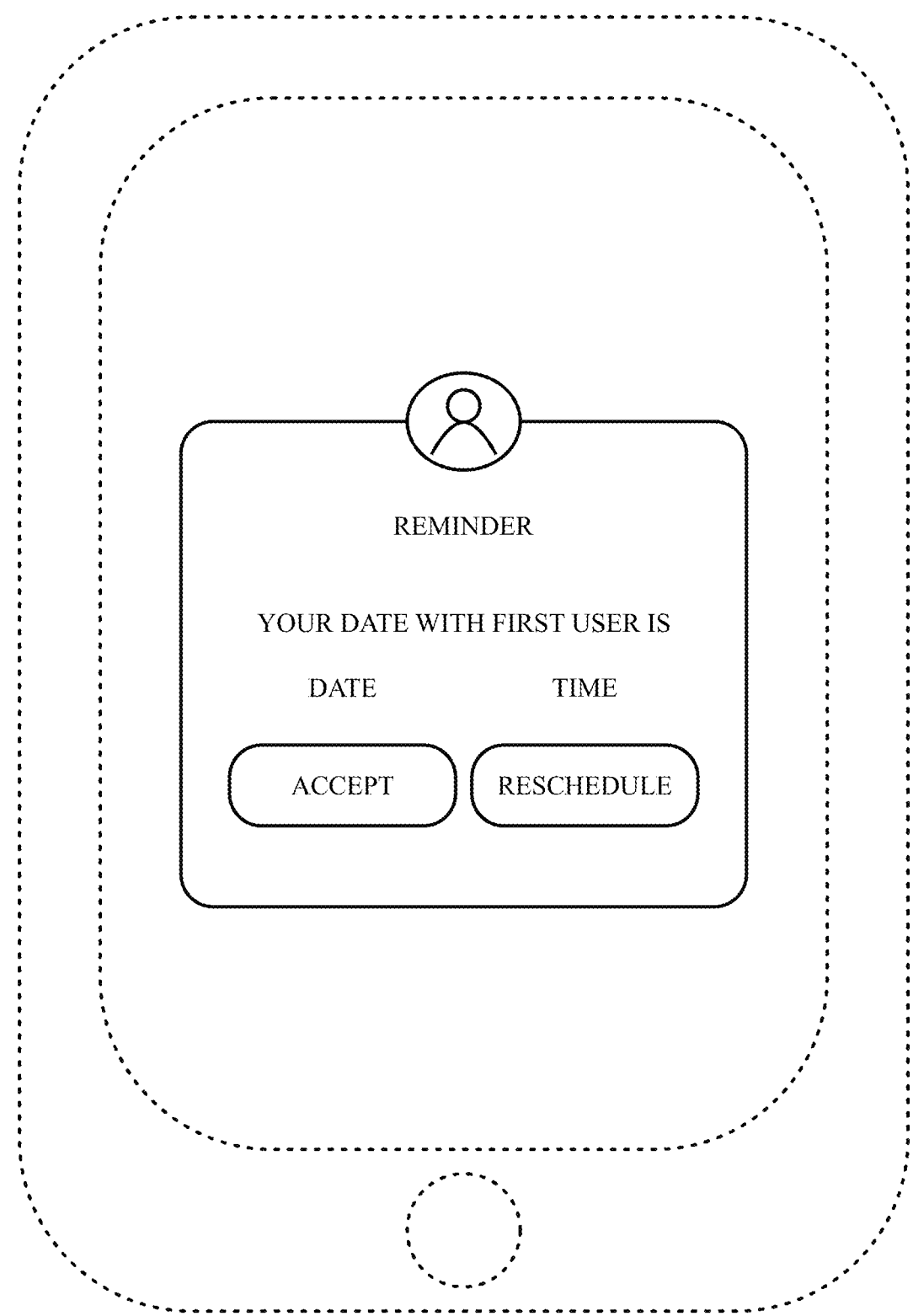
FIG. 10 is a schematic view for displaying the future date for the desired account with the screen of the personal computing device for the present invention.

The present invention is a system and method of dating through video profiles. The present invention remotely connects individuals looking for a compatible partner within a distance. More specifically, the present invention provides a platform for users to have a better understanding of perspective dating partners by being able to view the mannerisms, to hear the inflections in their voices, and to hear the overall tone of the perspective dating partners instead of reviewing a simple personal preferences list filled out by the perspective dating partners. Thus, the physical system used to implement the method for the present invention includes a plurality of user accounts managed by at least one remote server (Step A), as seen in FIG. 1 and FIG. 10. Furthermore, each user account is associated with a corresponding personal computing (PC) device, and wherein each user account includes a geospatial meeting radius and an introduction video. The remote server stores the information associated with each user account. More specifically, the remote server securely manages the communications between each user account. The remote server is only accessible by authorized administrators. In order for each user account to be able to remotely communicate with each other, the user PC device is preferably a smartphone but can alternatively be, but is not limited to, a desktop, a tablet PC, a smartwatch, and a laptop. The geospatial meeting radius limits the user accounts presented to a user account as a potential dating partner based on a distance around the user. It is understood that in various embodiments that the geospatial meeting radius may be adjusted based on user preference. The introduction video provides a visual and audio sample of the personality of the user associated with the corresponding user account. Moreover, the introduction video is unbiased presentation for the user account that prevents a user from doctoring any personal information for the review of other users. The introduction video is the main source of information for other users to review and then determine if other users wish to initiate direct communication with a user.

Figure 3:
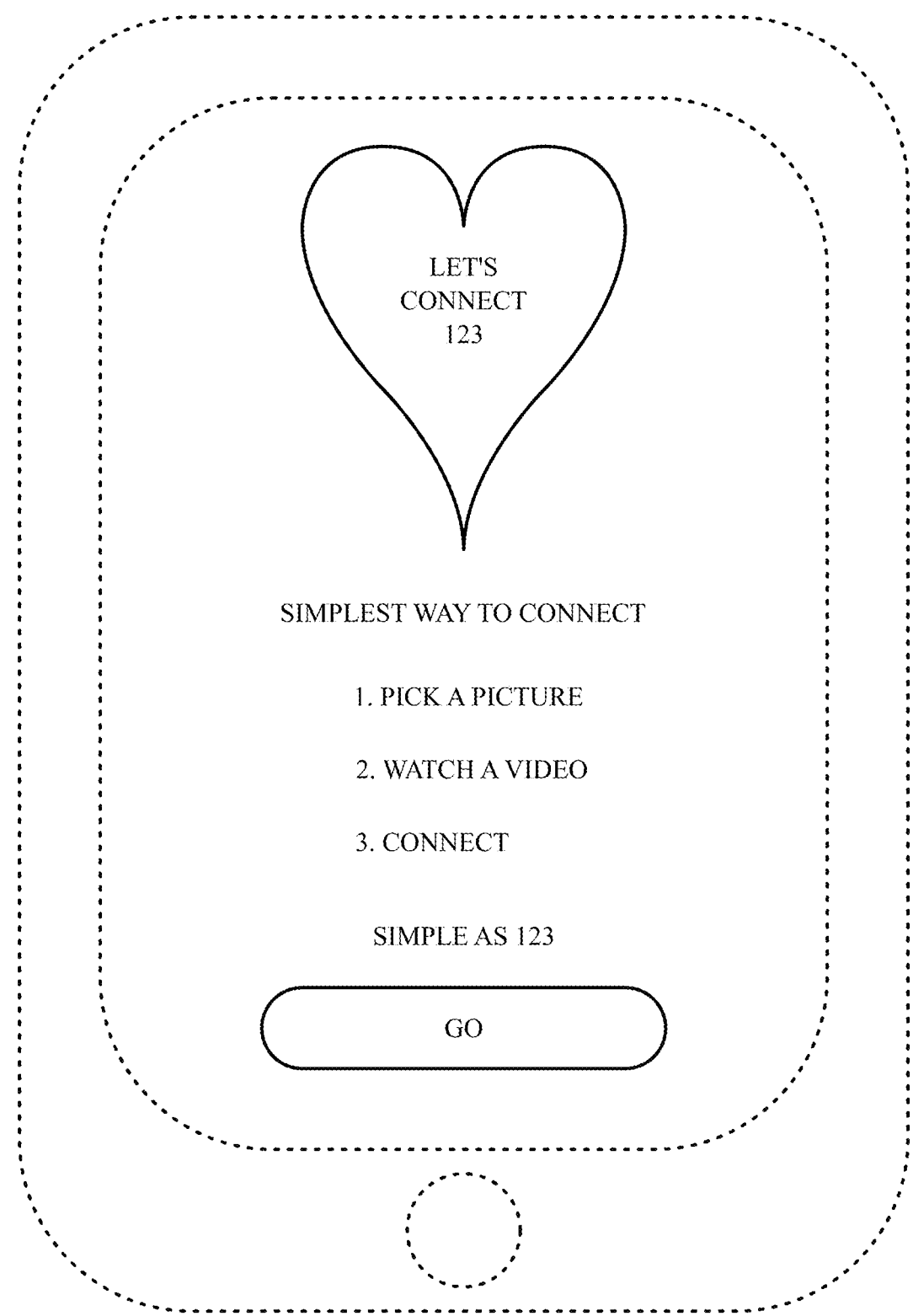
FIG. 3 is a schematic view for displaying an introduction page with the screen of the personal computing device for the present invention.
Figure 5:
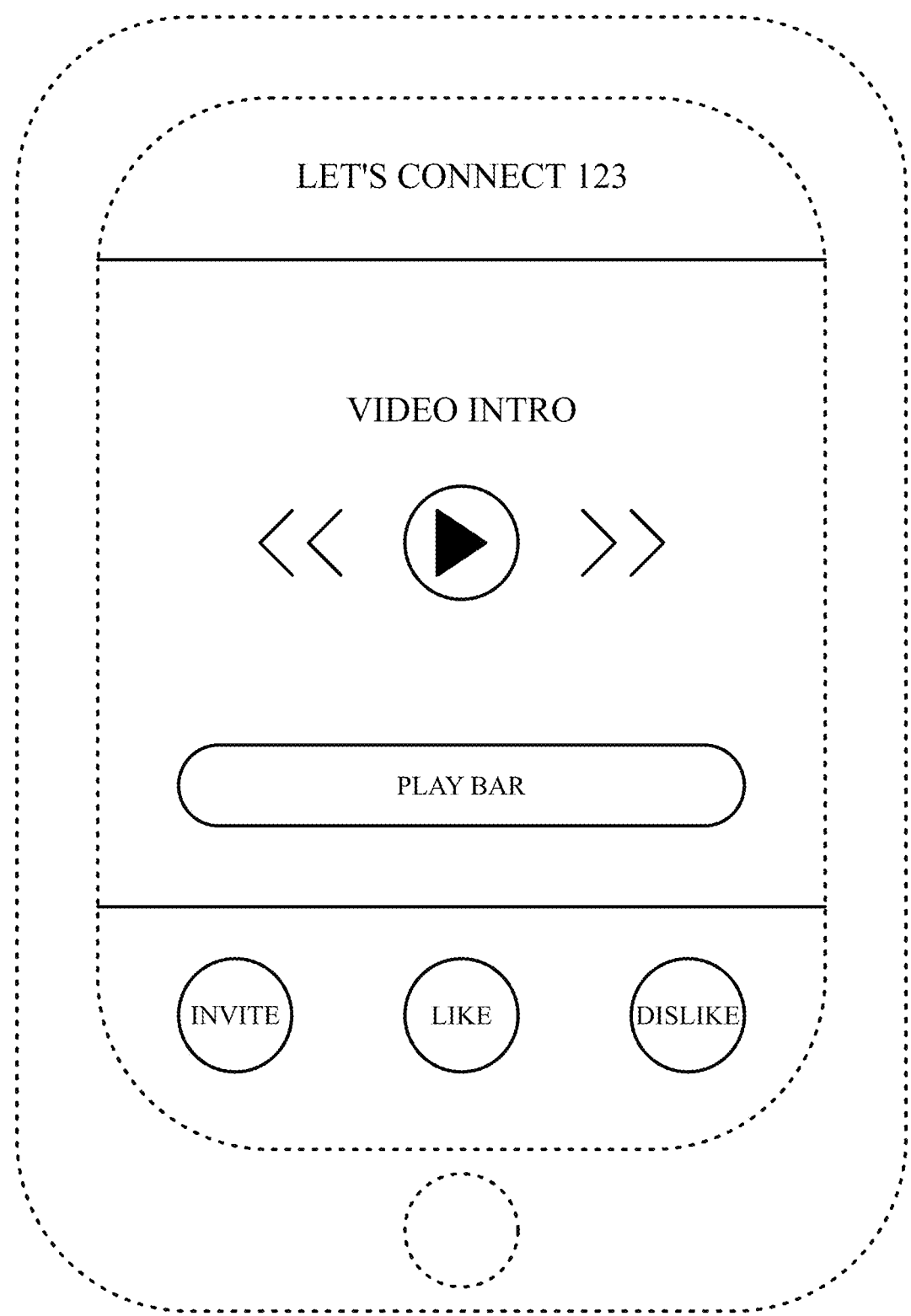
FIG. 5 is a schematic view for displaying an introduction video with the screen of the personal computing device for the present invention.
Figure 6:
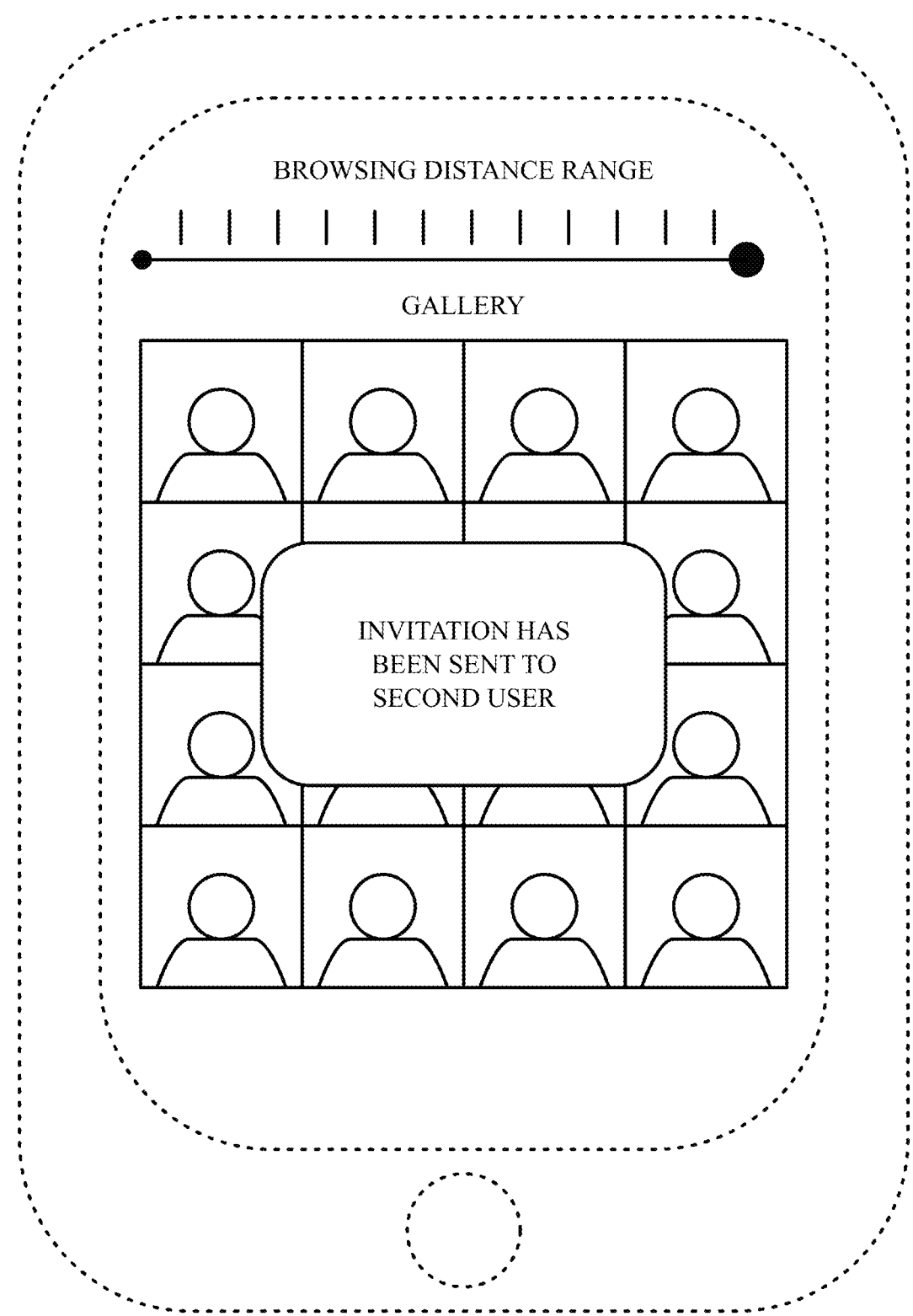
FIG. 6 is a schematic view for displaying a confirmation for a delivery of a video-viewing request with the screen of the personal computing device for the present invention.
Figure 7:
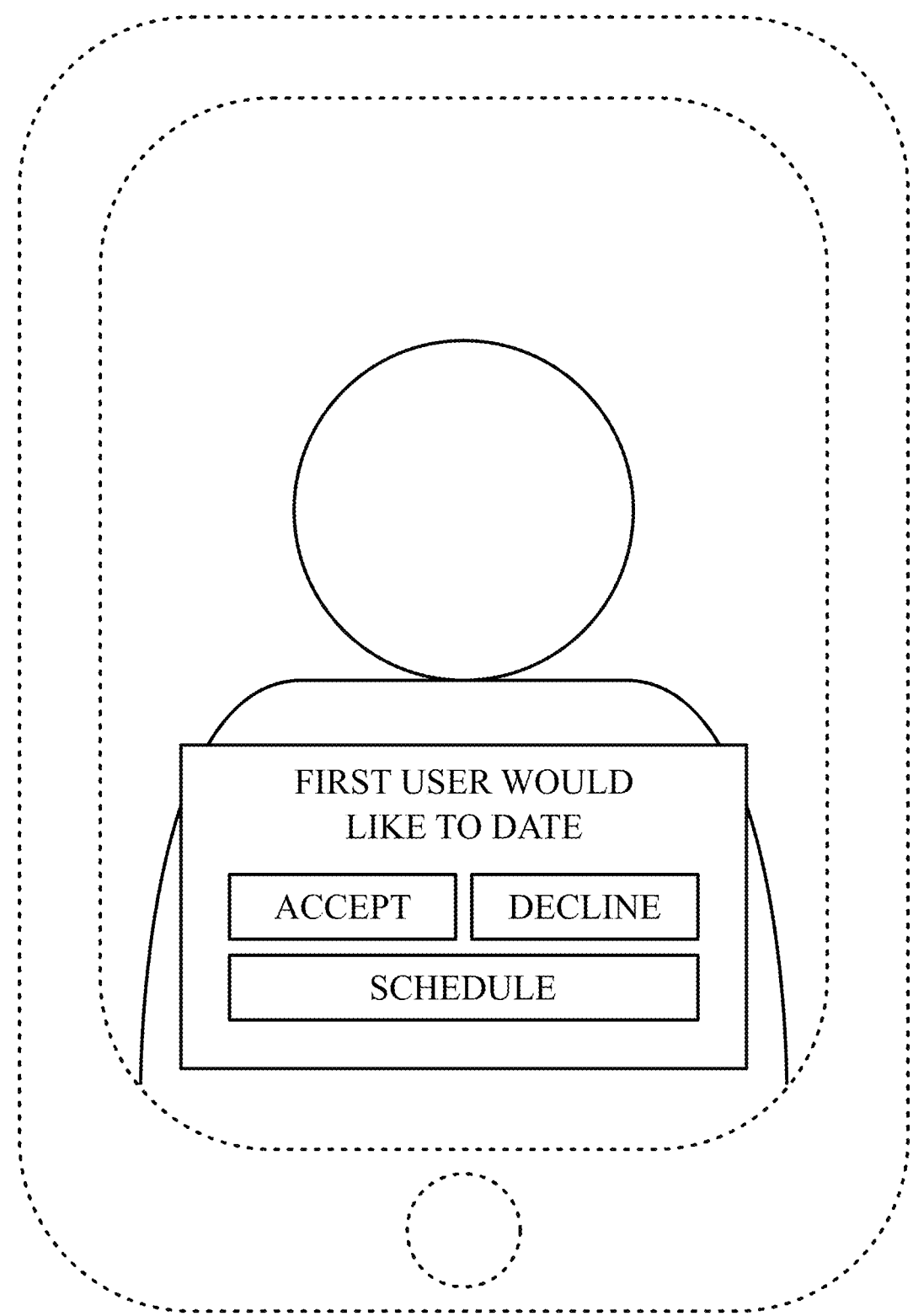
FIG. 7 is a schematic view for displaying the video-viewing request for a desired account with the screen of the personal computing device for the present invention.
Figure 8:
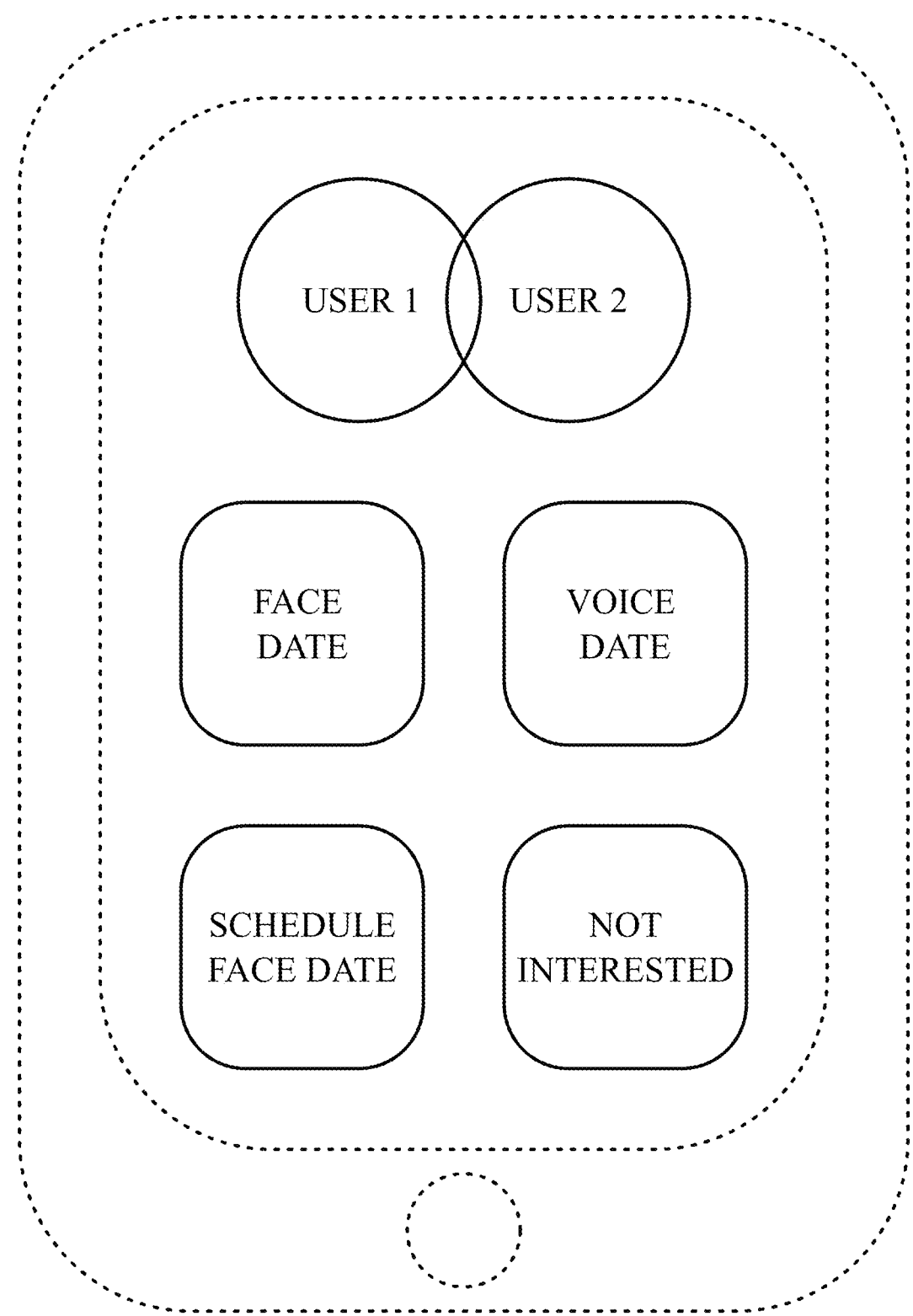
FIG. 8 is a schematic view for displaying the video date option, a phone date option, a future date option, and a decline option with the screen of the personal computing device for the present invention.
Figure 11:
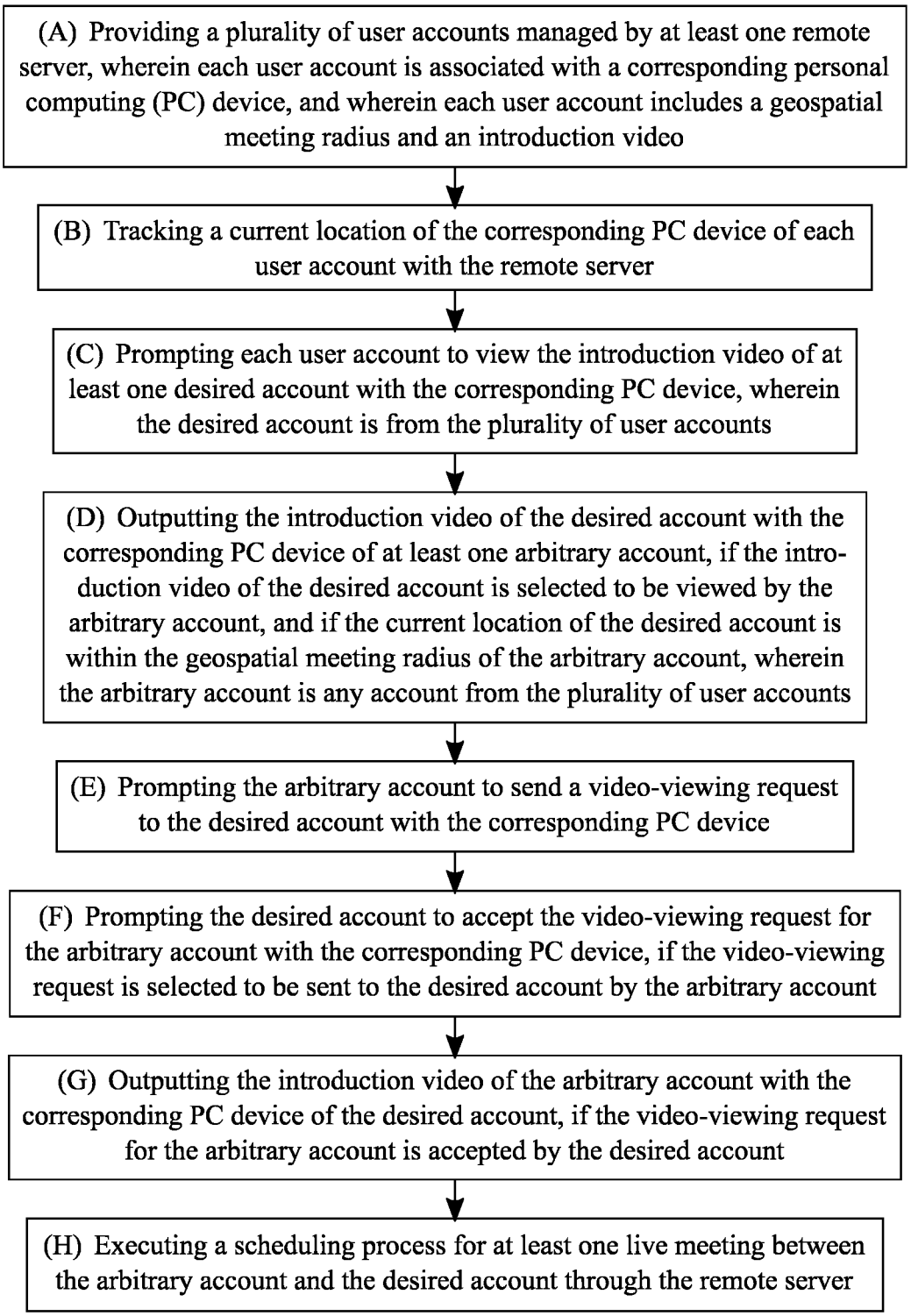
FIG. 11 is a flowchart illustrating the overall process for the method of the present invention.

The overall process for the method of the present invention includes the following steps that are implemented with at least one remote server and a corresponding PC device. In order to present user accounts that are within a given range of each other, the method begins tracking a current location of the corresponding PC device of each user account with the remote server (Step B), as seen in FIG. 11. The current location is the location of the corresponding PC device in real time. In order to get a better understanding of a user account, each user account is prompted to view the introduction video of at least one desired account with the corresponding PC device (Step C), wherein the desired account is from the plurality of user accounts, as seen in FIG. 3 and FIG. 5. More specifically, the desired account is a perspective dating partner. Once the interest of an arbitrary user is sparked, the introduction video of the desired account is outputted with the corresponding PC device of at least one arbitrary account (Step D), if the introduction video of the desired account is selected to be viewed by the arbitrary account, and if the current location of the desired account is within the geospatial meeting radius of the arbitrary account, wherein the arbitrary account is any account from the plurality of user accounts. The arbitrary account is any user account that is reviewing at least one desired account. The arbitrary account is better able to review the desired account during Step D with the introduction video. The arbitrary account has the option of alerting the desired account of their interest as the arbitrary account is then prompted to send a video-viewing request to the desired account with the corresponding PC device (Step E), as seen in FIG. 6. The video-viewing request presents the desired account with the option to view the introduction video or dismiss the introduction video. The desired account is notified of the interest of the arbitrary account once the desired account is prompted to accept the video-viewing request for the arbitrary account with the corresponding PC device (Step F), if the video-viewing request is selected to be sent to the desired account by the arbitrary account, as seen in FIG. 7. The desired account is able to review the arbitrary account as the introduction video of the arbitrary account is outputted with the corresponding PC device of the desired account, if the video-viewing request for the arbitrary account is accepted by the desired account (Step G). A scheduling process for at least one live meeting is executed between the arbitrary account and the desired account through the remote server (Step H). The scheduling process allows the desired account to confirm any interest for the arbitrary account by selecting an immediate date or requesting a date for the future if not available. More specifically, the scheduling process also allows the desired account to decline any interest for the arbitrary account during the scheduling process. The at least one live meeting is a video date or a phone date that requires the desired account and the arbitrary account to directly communicate with each other and get a better understanding of each other more than simply through messaging each other.

Figure 12:
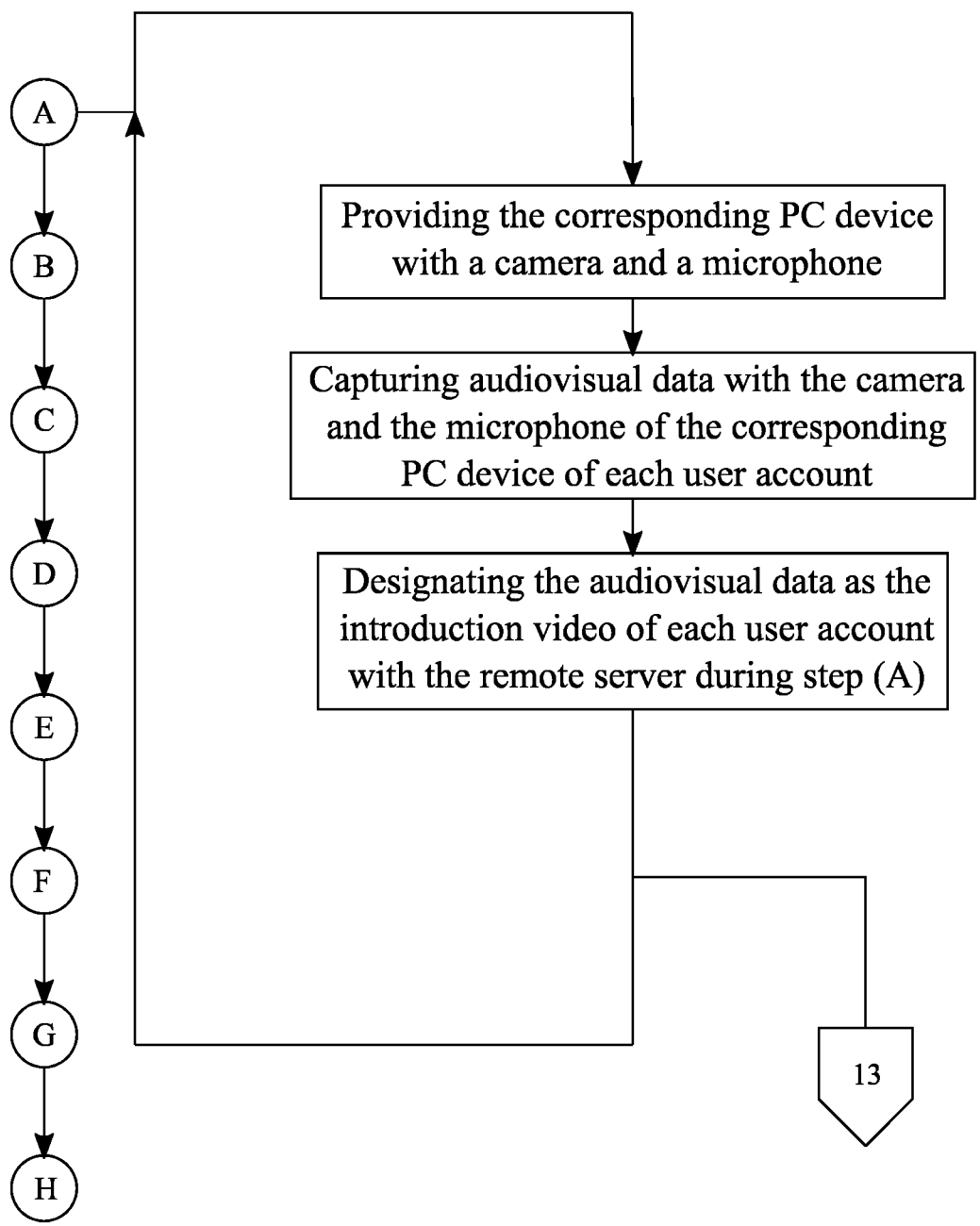
FIG. 12 is a flowchart illustrating the subprocess of recording an introduction video for a user account.

In order to further prevent a user from misleading other users of their personal appearance, each introduction video is captured with the present invention, as seen in FIG. 12. Moreover, the corresponding PC device includes a camera and a microphone in order for the application to be able to record the introduction video. It is understood that the present invention provides a video recording feature that utilizes the camera and microphone of the corresponding PC device. A user account is hindered from posing or 'catfishing' as another individual by capturing audiovisual data with the camera and the microphone of the corresponding PC device of each user account. The audiovisual data captures the mannerisms and inflections for the user with the user account. The audiovisual data is designated as the introduction video of each user account with the remote server during Step A, thereby securing and associating the introduction video with the user account.

Figure 13:
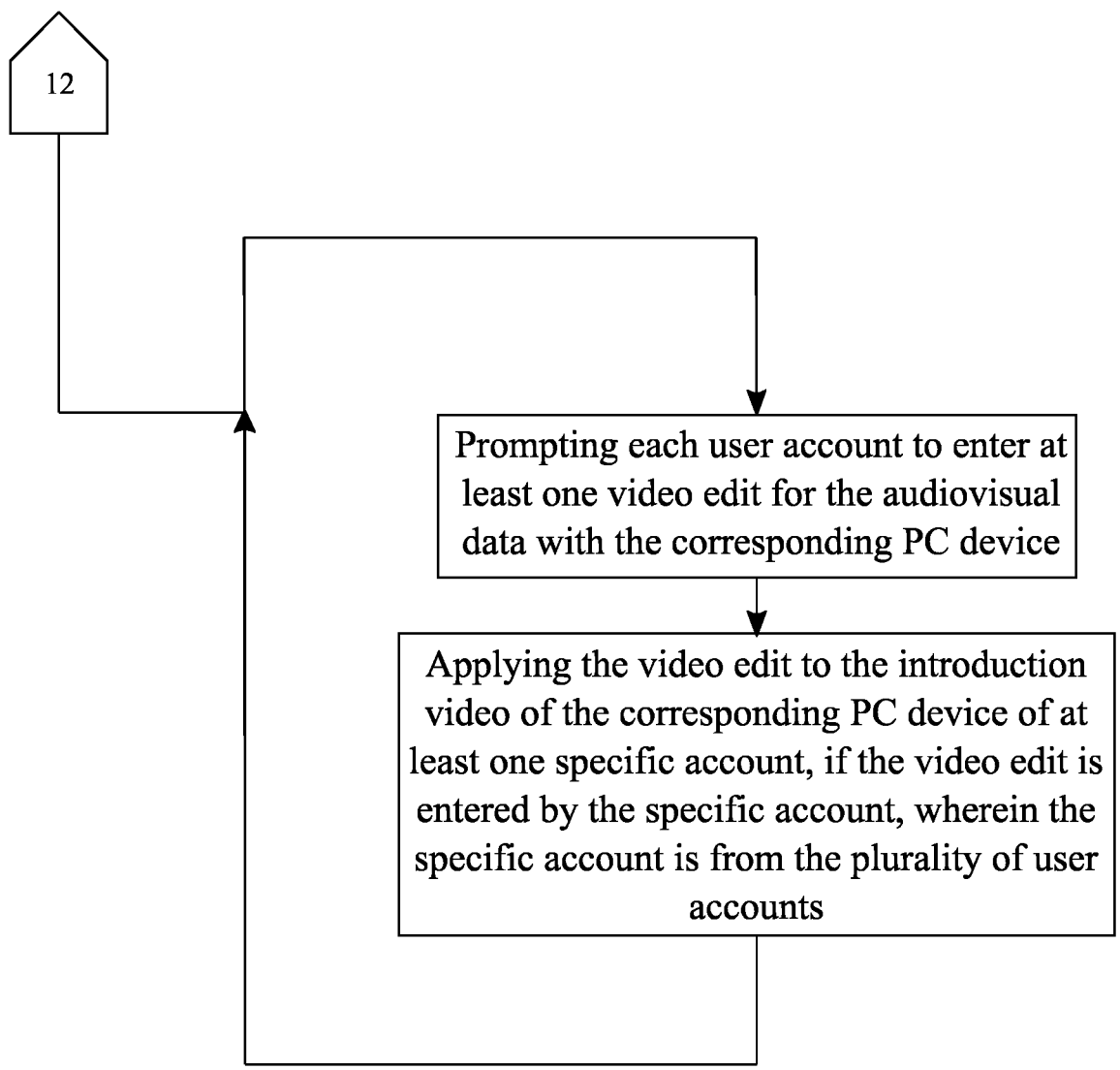
FIG. 13 is a flowchart illustrating the subprocess of editing the introduction video for a specific user account.

Furthermore, a user may edit their introduction video in order to display a more appealing presentation. Each user account is prompted to enter at least one video edit for the audiovisual data with the corresponding PC device, FIG. 13. The video edit may include, but is not limited to, applying a filter, a color adjustment, a sharpness adjustment, a brightness adjustment, and a contrast adjustment. The introduction video is adjusted as the video edit is applied to the introduction video of the corresponding PC device of at least one specific account, if the video edit is entered by the specific account, wherein the specific account is from the plurality of user accounts. The specific account is the user account associated with the introduction video such that only the specific account may adjust the introduction video and no other user account may adjust the introduction video of the specific account.

Figure 14:
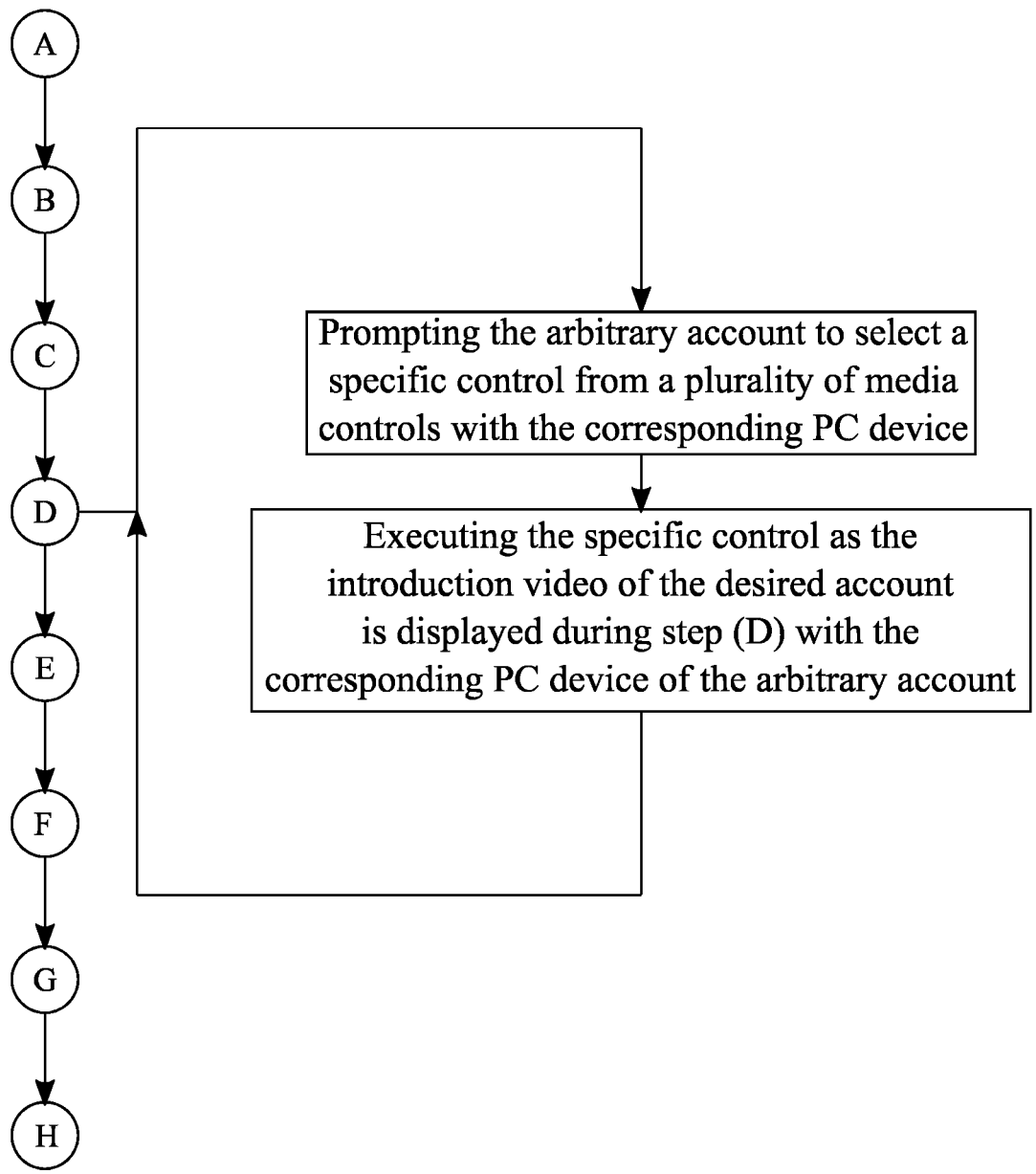
FIG. 14 is a flowchart illustrating the subprocess of an arbitrary account applying a specific media control to the introduction video of the desired amount.

In order for the arbitrary user to thoroughly view an introduction video, the arbitrary account is prompted to select a specific control from a plurality of media controls with the corresponding PC device, as seen in FIG. 14. The specific control may include, but is not limited to, playback, rewind, forward, and pause. In order to view the introduction video as desired by the arbitrary account, the specific control is executed as the introduction video of the desired account is displayed during Step D with the corresponding PC device of the arbitrary account.

Figure 15:
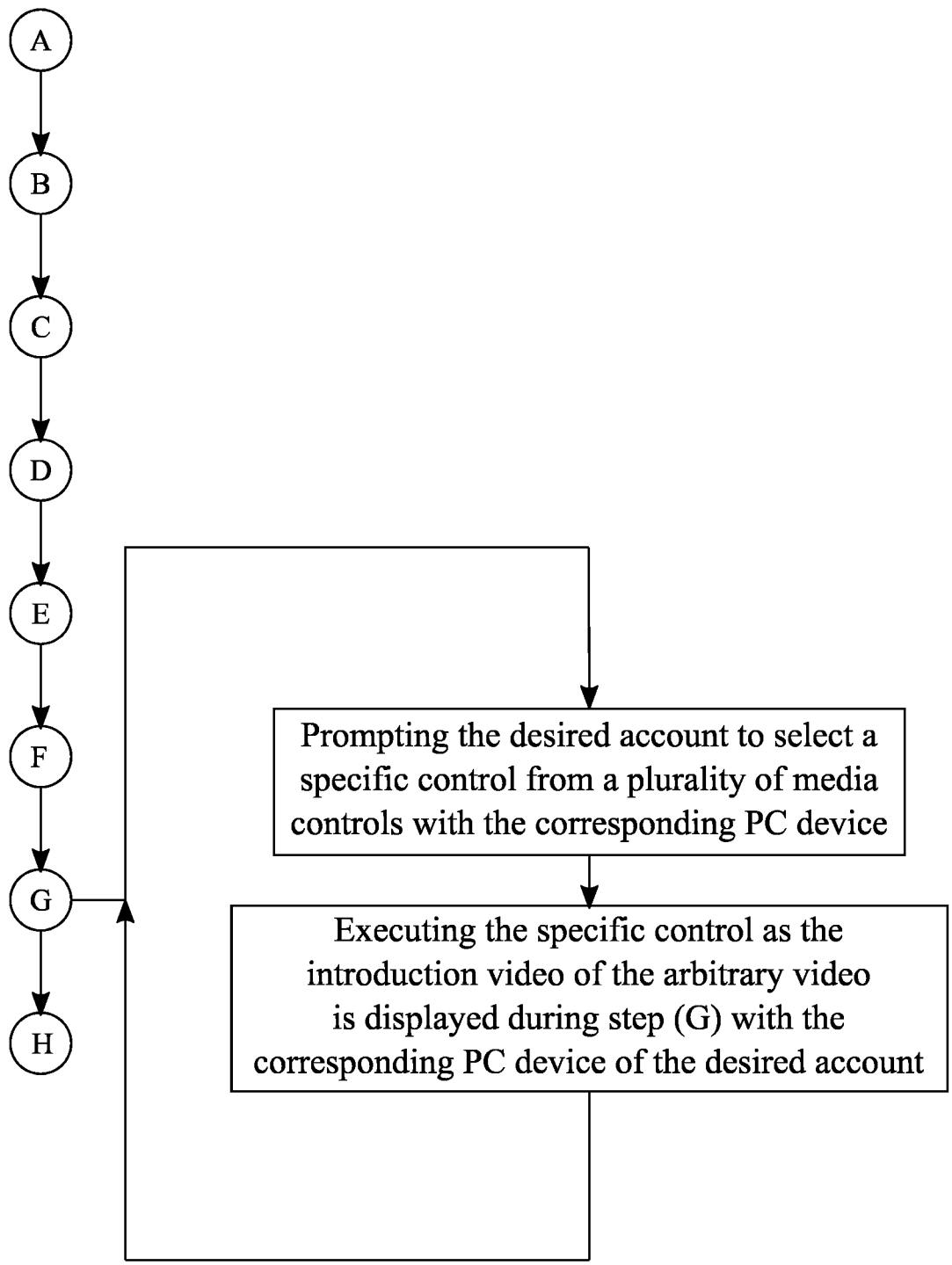
FIG. 15 is a flowchart illustrating the subprocess of the desired account applying a specific media control to the introduction video of the arbitrary account.

In order for the desired user to thoroughly view an introduction video, the desired account is prompted to select a specific control from a plurality of media controls with the corresponding PC device, as seen in FIG. 15. Likewise, the specific control may include, but is not limited to playback, rewind, forward, and pause. In order to view the introduction video as desired by the desired account, the specific control is executed as the introduction video of the arbitrary video is displayed during Step G with the corresponding PC device of the desired account.

Figure 16:
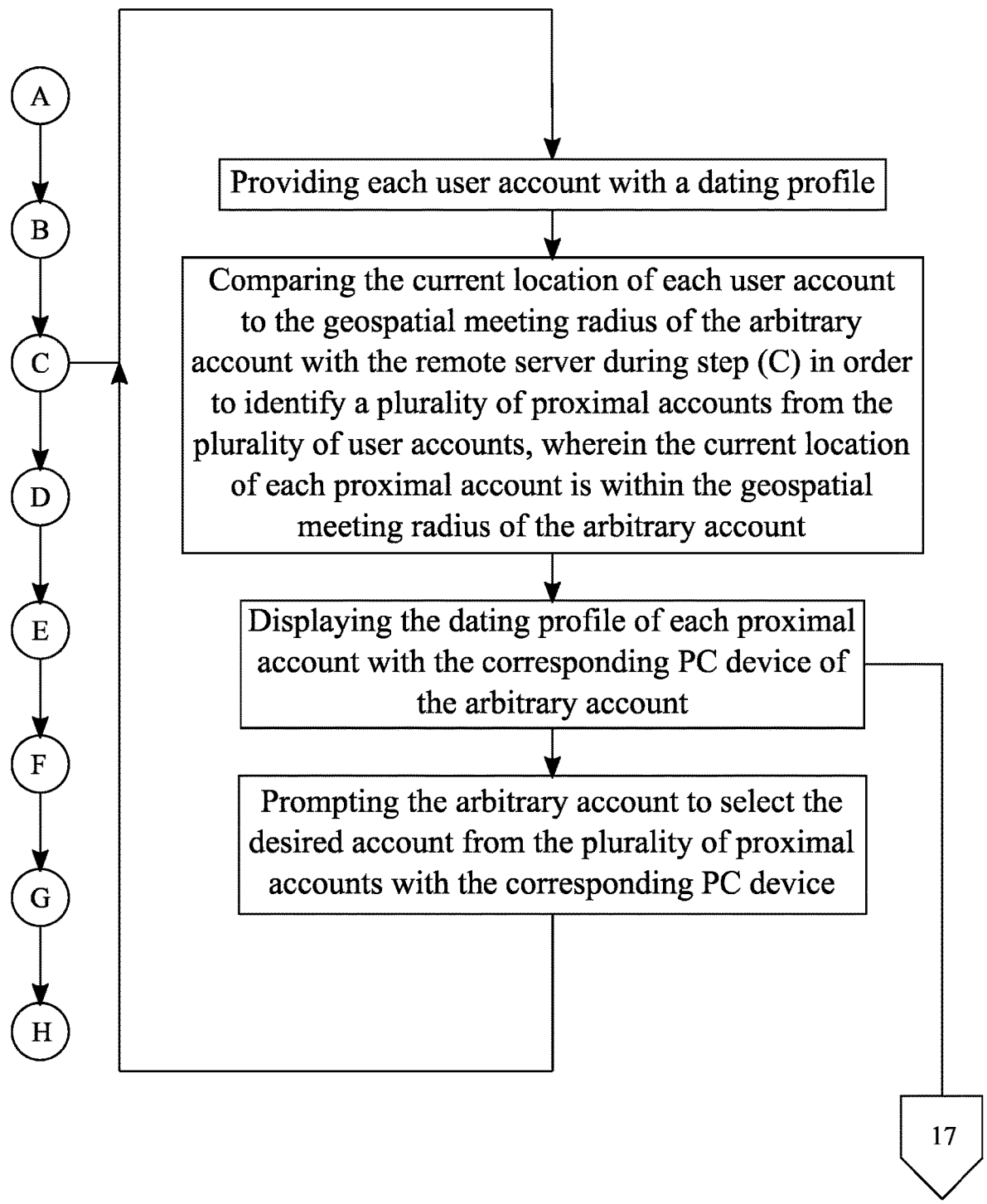
FIG. 16 is a flowchart illustrating the subprocess of determining which user account is within a geospatial meeting radius for the arbitrary account.

The present invention is able to determine which user accounts are within the geospatial range of each other as each user account includes a dating profile, seen in FIG. 16. The dating profile includes personal information both private and public. Such personal information designated as private includes, but is not limited to, a last name, an age, a gender, a gender preference for perspective dating partners, and a set of contact information. Such personal information designated as public includes an uploaded or captured profile picture and a first name. In the preferred embodiment of the present invention, each user account may like or dislike a dating profile, or specifically a profile picture. In order to present user accounts within the geospatial range of the arbitrary account, the current location of each user account is compared to the geospatial meeting radius of the arbitrary account with the remote server during Step C in order to identify a plurality of proximal accounts from the plurality of user accounts, wherein the current location of each proximal account is within the geospatial meeting radius of the arbitrary account. The dating profile of each proximal account is displayed with the corresponding PC device of the arbitrary account, thereby allowing the arbitrary account to review perspective dating partners within the geospatial meeting radius. The arbitrary account is then prompted to select the desired account from the plurality of proximal accounts with the corresponding PC device, which allows the arbitrary account to select one of the proximal accounts as a perspective dating partner.

Figure 4:
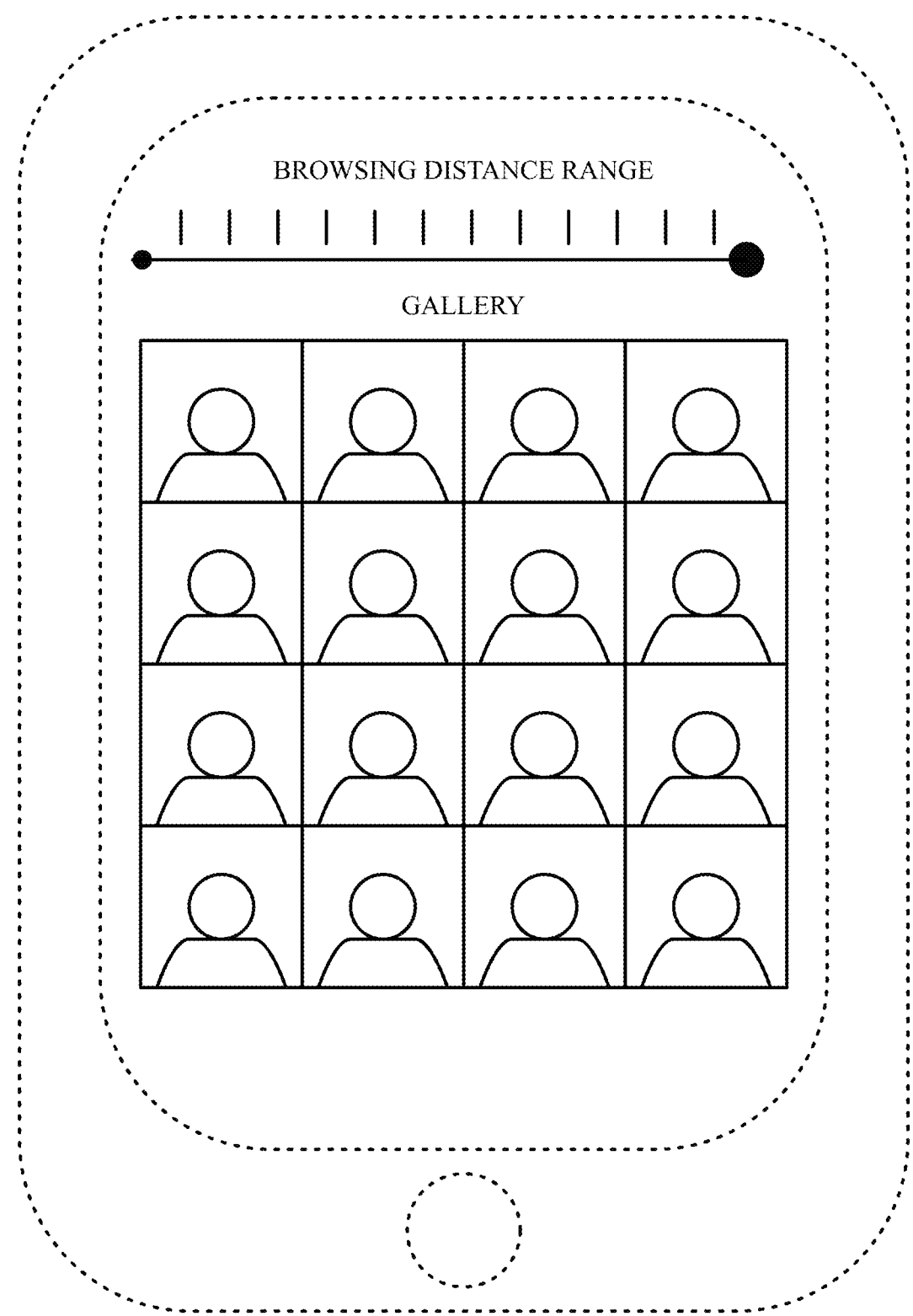
FIG. 4 is a schematic view for displaying a plurality of user accounts with the screen of the personal computing device for the present invention.
Figure 17:
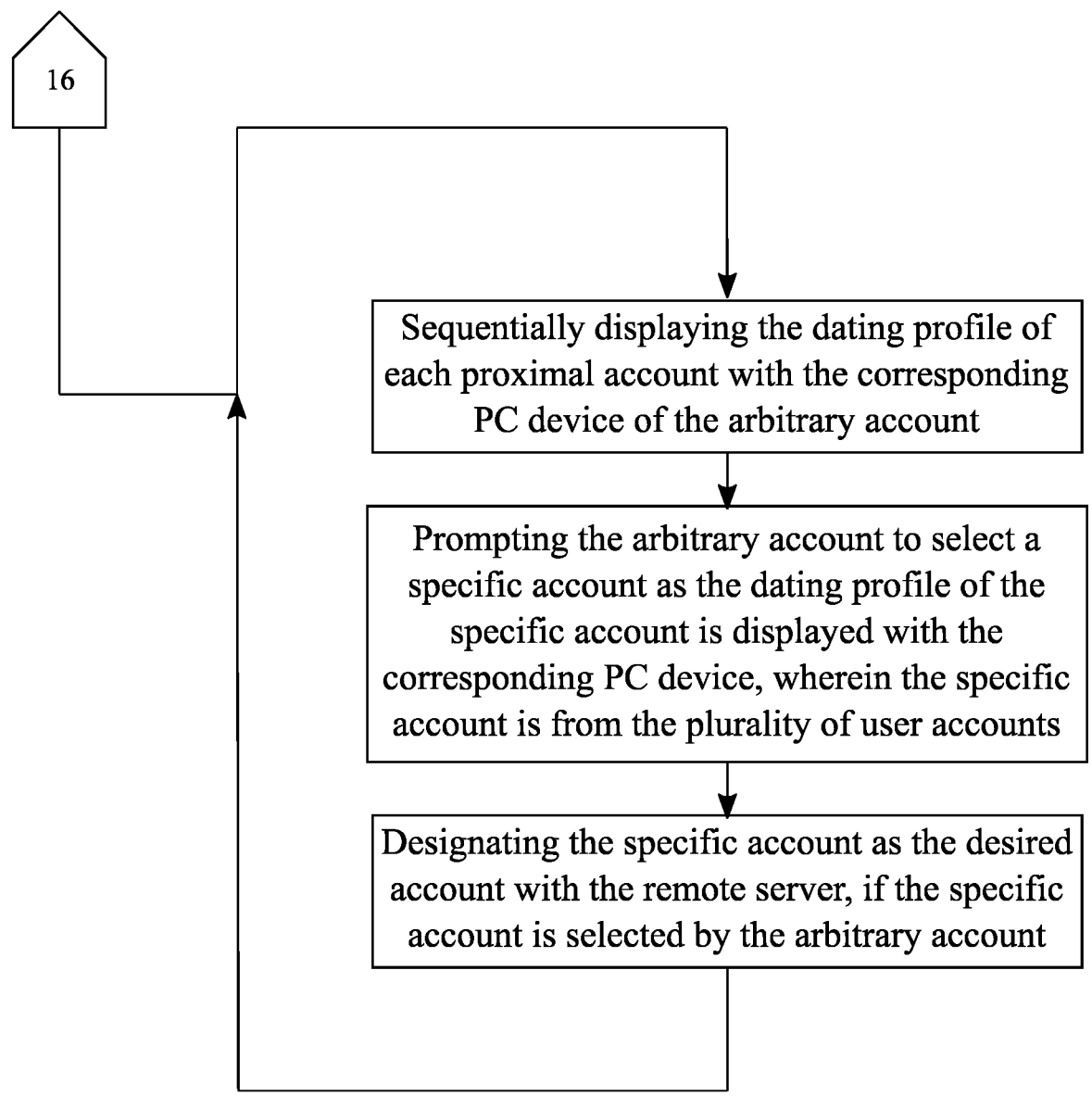
FIG. 17 is a flowchart illustrating the subprocess of sequentially displaying a dating profile of each proximal account of the plurality of user accounts in order to designate a specific account as the desired account.

In order for the arbitrary user to thoroughly view the plurality of user accounts, the dating profile of each proximal account is sequentially displayed with the corresponding PC device of the arbitrary account, seen in FIG. 17. In the preferred embodiment of the present invention, the plurality of user accounts is displayed in a photo gallery, seen in FIG. 4. While sequentially displaying the dating profile of each proximal account, each dating profile is enlarged to fit a screen of the corresponding PC device, and the arbitrary account may swipe the screen in order to view the previous or next dating profile. Once the arbitrary account has come across a dating profile of interest, the arbitrary account is prompted to select a specific account as the dating profile of the specific account is displayed with the corresponding PC device, wherein the specific account is from the plurality of user accounts. The specific account is designated as the desired account with the remote server, if the specific account is selected by the arbitrary account. Moreover, the arbitrary account is then able to view the introduction video of the specific account.

Figure 18:
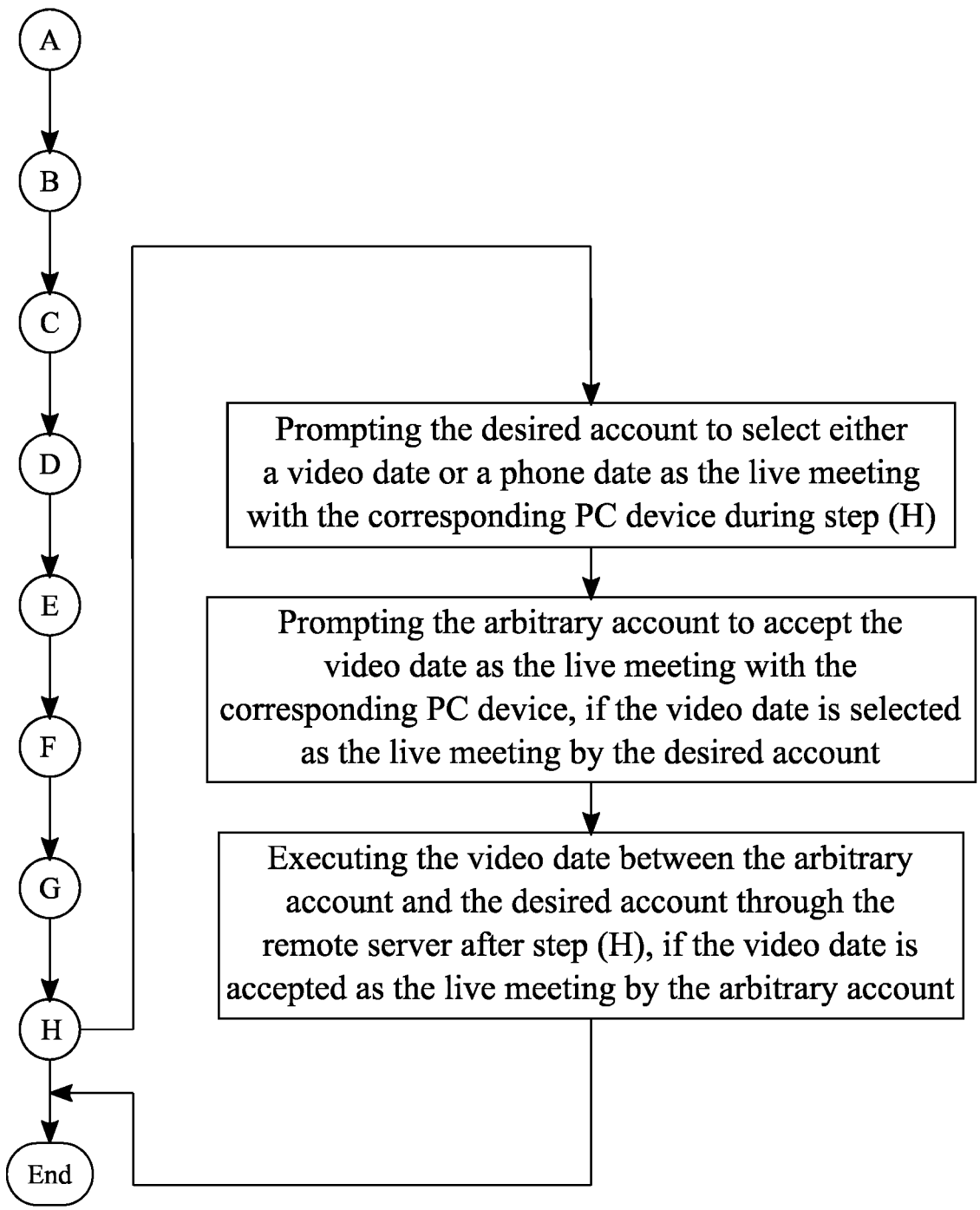
FIG. 18 is a flowchart illustrating the subprocess of initiating a video date.

In order for the arbitrary user to directly interact with the desired user, the desired account is prompted to select either a video date or a phone date as the live meeting with the corresponding PC device during Step H, seen in FIG. 18. The video date is a video call that is done directly through the present invention. Likewise, the phone date is a phone call that is done directly through the present invention. More specifically, because the video date and the phone date are facilitated through a video call feature and a phone call feature of the present invention, limited personal information is made public until the arbitrary account and the desired account are ready to share personal information with each other. In order to receive consent from the user of the arbitrary account for the video call, the arbitrary account is prompted to accept the video date as the live meeting with the corresponding PC device, if the video is selected as the live meeting by the desired account. The arbitrary account and the desired account are able to view and hear each other as the video date is executed between the arbitrary account and the desired account through the remote server after Step H, if the video date is accepted as the live meeting by the arbitrary account.

Figure 19:
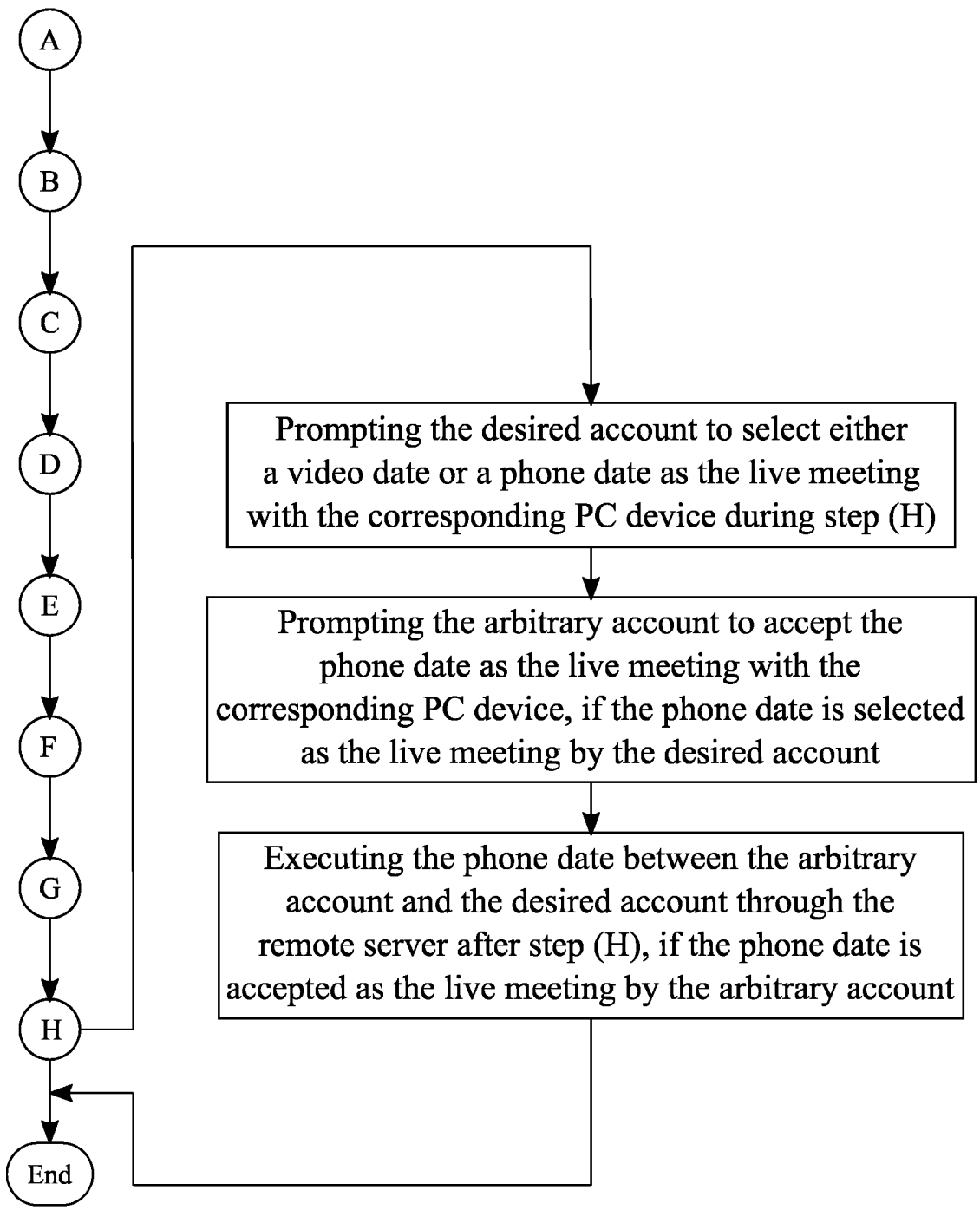
FIG. 19 is a flowchart illustrating the subprocess of initiating a phone date.

If the arbitrary account prefers a phone call over a video call, the desired account may choose so as the desired account is prompted to select either a video date or a phone date as the live meeting with the corresponding PC device during Step H, seen in FIG. 19. In order to receive consent from the user of the arbitrary account for the phone call, the arbitrary account is prompted to accept the phone date as the live meeting with the corresponding PC device, if the phone date is selected as the live meeting by the desired account. The arbitrary account and the desired account are able to hear each other as the phone date is executed between the arbitrary account and the desired account through the remote server after Step H, if the phone date is accepted as the live meeting by the arbitrary account.

Figure 9:
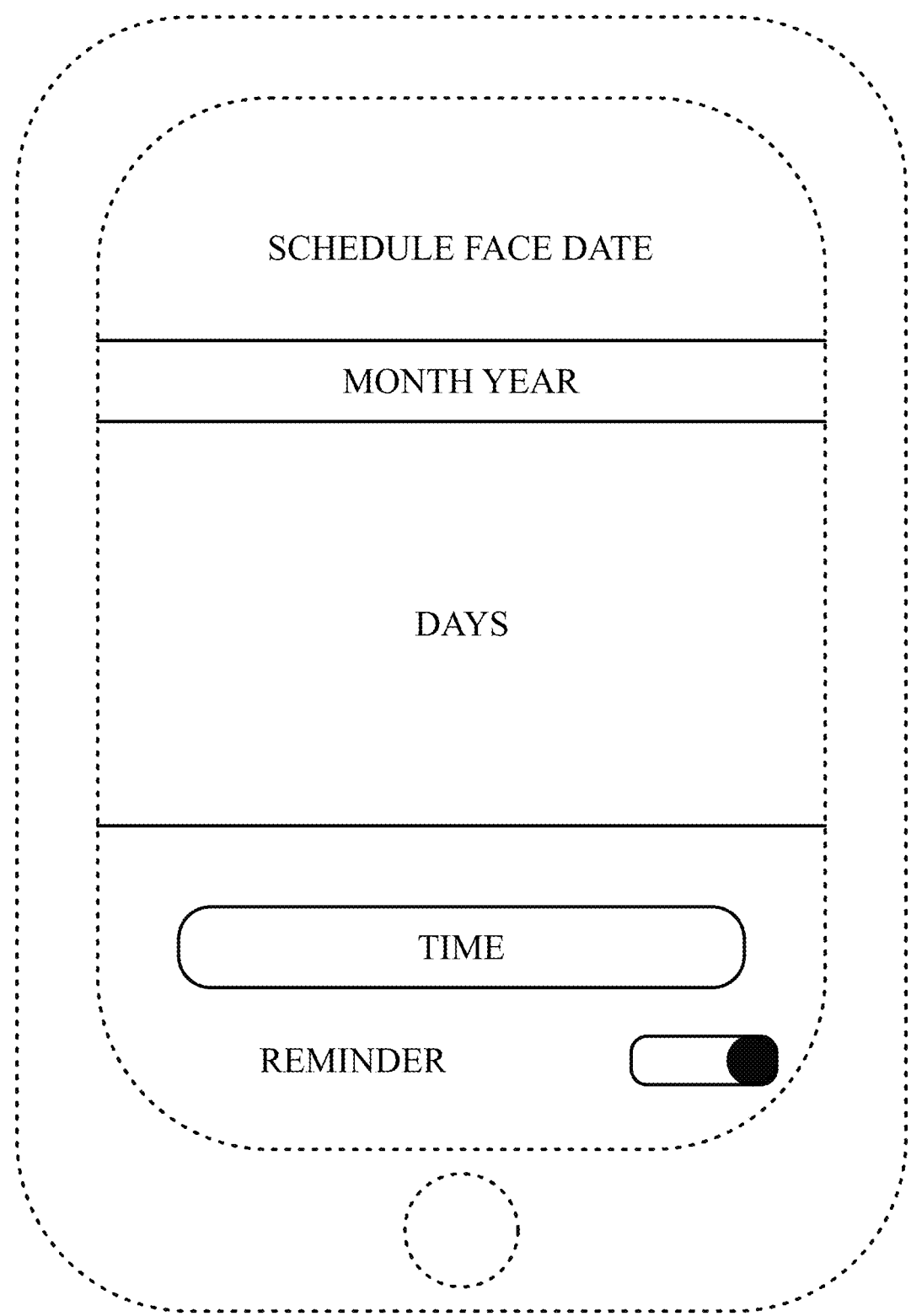
FIG. 9 is a schematic view for displaying the future date scheduled by an arbitrary account with the screen of the personal computing device for the present invention.
Figure 20:
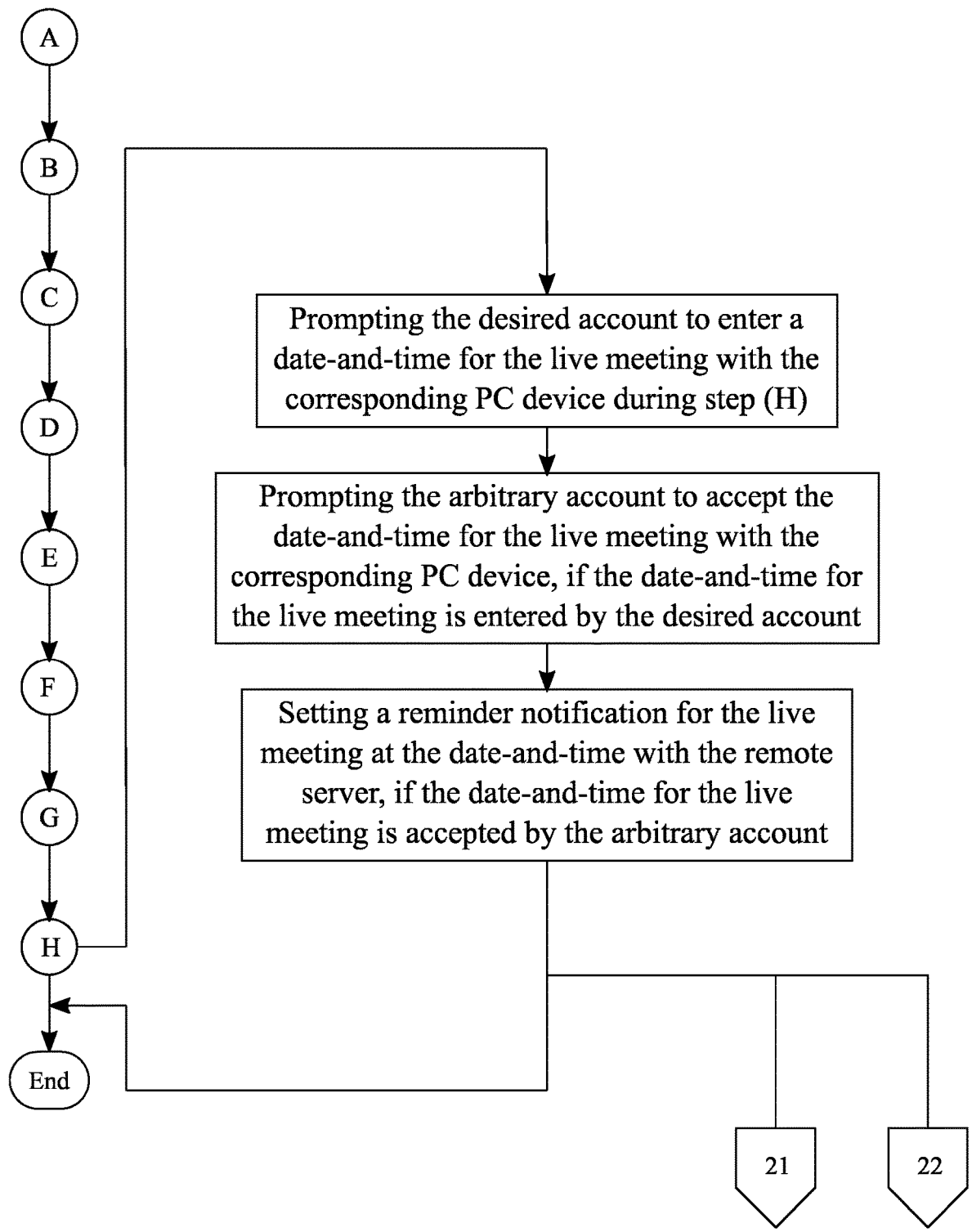
FIG. 20 is a flowchart illustrating the subprocess of setting a live meeting for the future.

If the desired account is not able to immediately have a video date or a phone date, a date may be scheduled for the sometime in the near future, as seen in FIG. 9. In order to reschedule, the desired account is prompted to enter a date-and-time for the live meeting with the corresponding PC device during Step H, seen in FIG. 20. The date-and-time provides an available date and time of the desired account for the live meeting. The arbitrary account may review the date-and-time as the arbitrary account is prompted to accept the date-and-time for the live meeting with the corresponding PC device, if the date-and-time for the live meeting is entered by the desired account. The availability of the arbitrary account is confirmed as well during the date-and-time for the live meeting as a reminder notification for the live meeting at the date-and-time is set with the remote server, if the date-and-time for the live meeting is accepted by the arbitrary account, seen in FIG. 10. The reminder notification alerts both the arbitrary account and the desired account of the live meeting. The reminder notification is preferably associated with a calendar feature of the present invention. The calendar feature appends each live meeting associated with each desired account for the arbitrary account into a calendar of the arbitrary account. The calendar records and stores each live meeting to organize and notify the arbitrary account of all live meetings.

Figure 21:
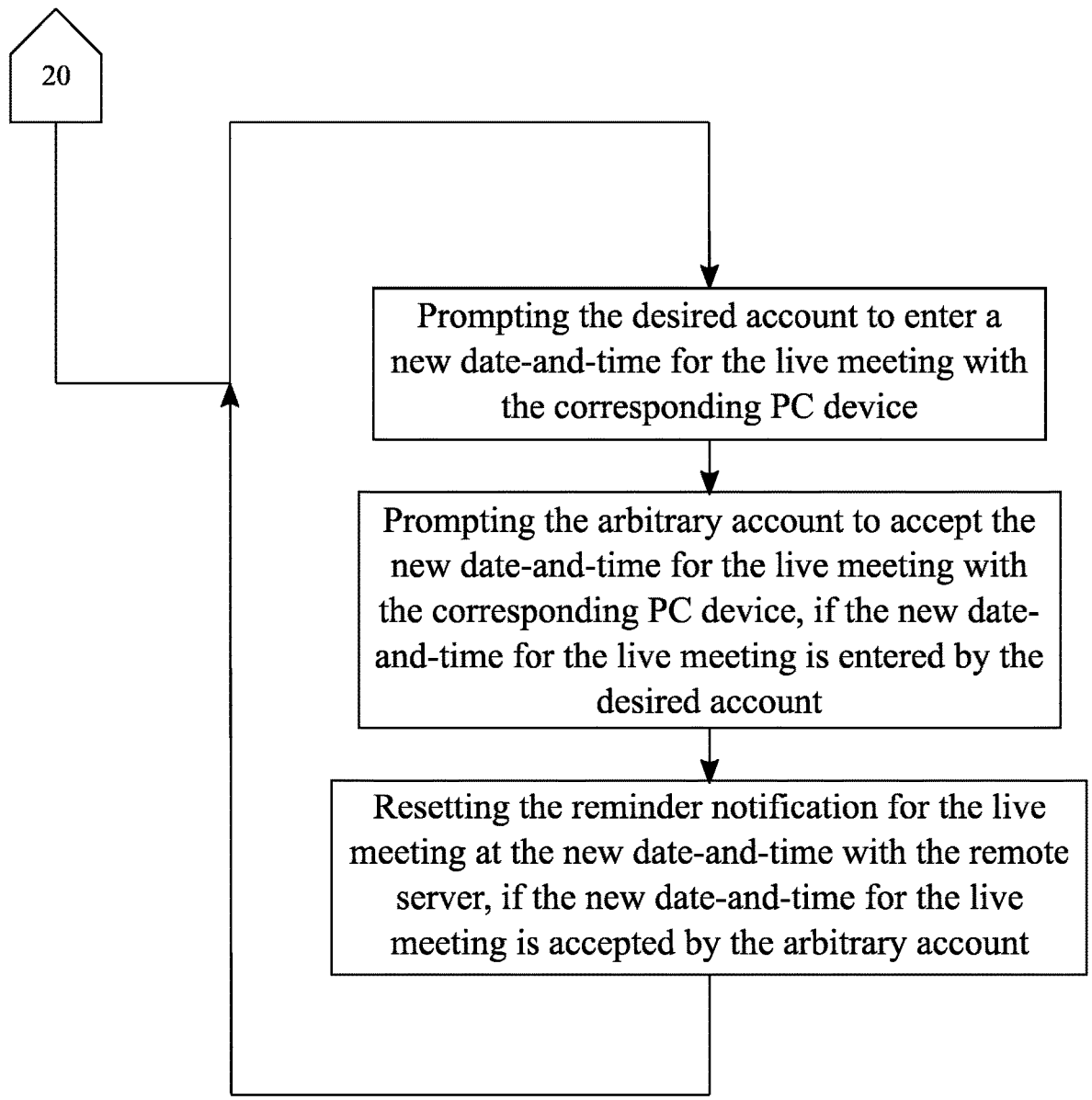
FIG. 21 is a flowchart illustrating the subprocess of the desired account rescheduling the live meeting for the future.

If the desired account needs to reschedule the live meeting, the desired account is prompted to enter a new date-and-time for the live meeting with the corresponding PC device, seen in FIG. 21. The new date-and-time is a different date and time that the desired account is available for the live meeting. The arbitrary account is notified as the arbitrary account is prompted to accept the new date-and-time for the live meeting with the corresponding PC device, if the new date-and-time for the live meeting is entered by the desired account. The reminder notification for the live meeting is reset as the new date-and-time with the remote server, if the new date-and-time for the live meeting is accepted by the arbitrary account, thereby providing an up-to-date calendar for both the arbitrary account and the desired account.

Figure 22:
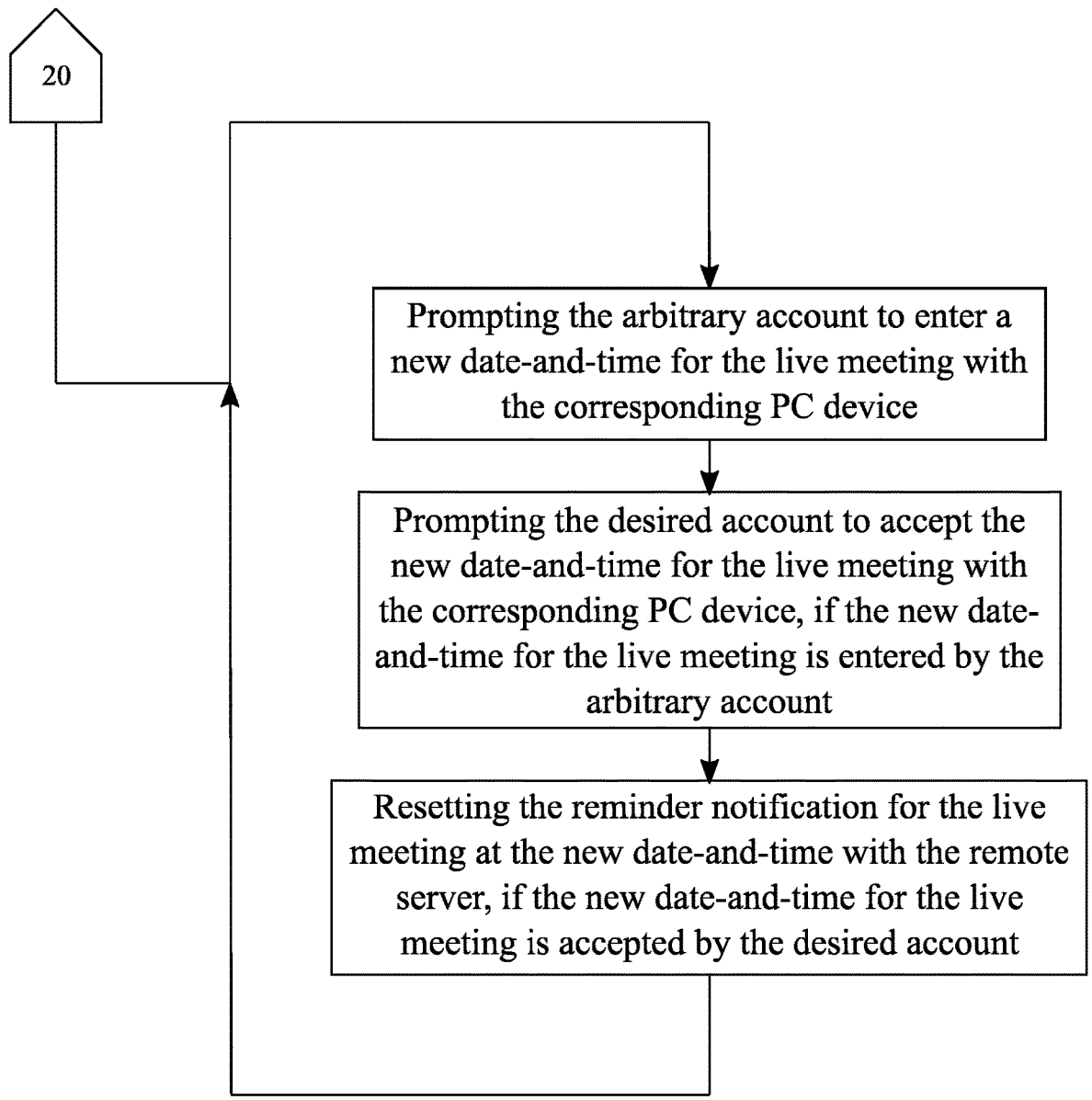
FIG. 22 is a flowchart illustrating the subprocess of the arbitrary account rescheduling the live meeting for the future.

If the arbitrary account needs to reschedule the live meeting, the arbitrary account is prompted to enter a new date-and-time for the live meeting with the corresponding PC device, seen in FIG. 22. The new date-and-time is a different date and time that the arbitrary account is available for the live meeting. The desired account is notified as the desired account is prompted to accept the new date-and-time for the live meeting with the corresponding PC device, if the new date-and-time for the live meeting is entered by the arbitrary account. The reminder notification for the live meeting is reset at the new date-and-time with the remote server, if the new date-and-time for the live meeting is accepted by the desired account, thereby providing an up-to-date calendar for both the arbitrary account and the desired account.

Figure 23:
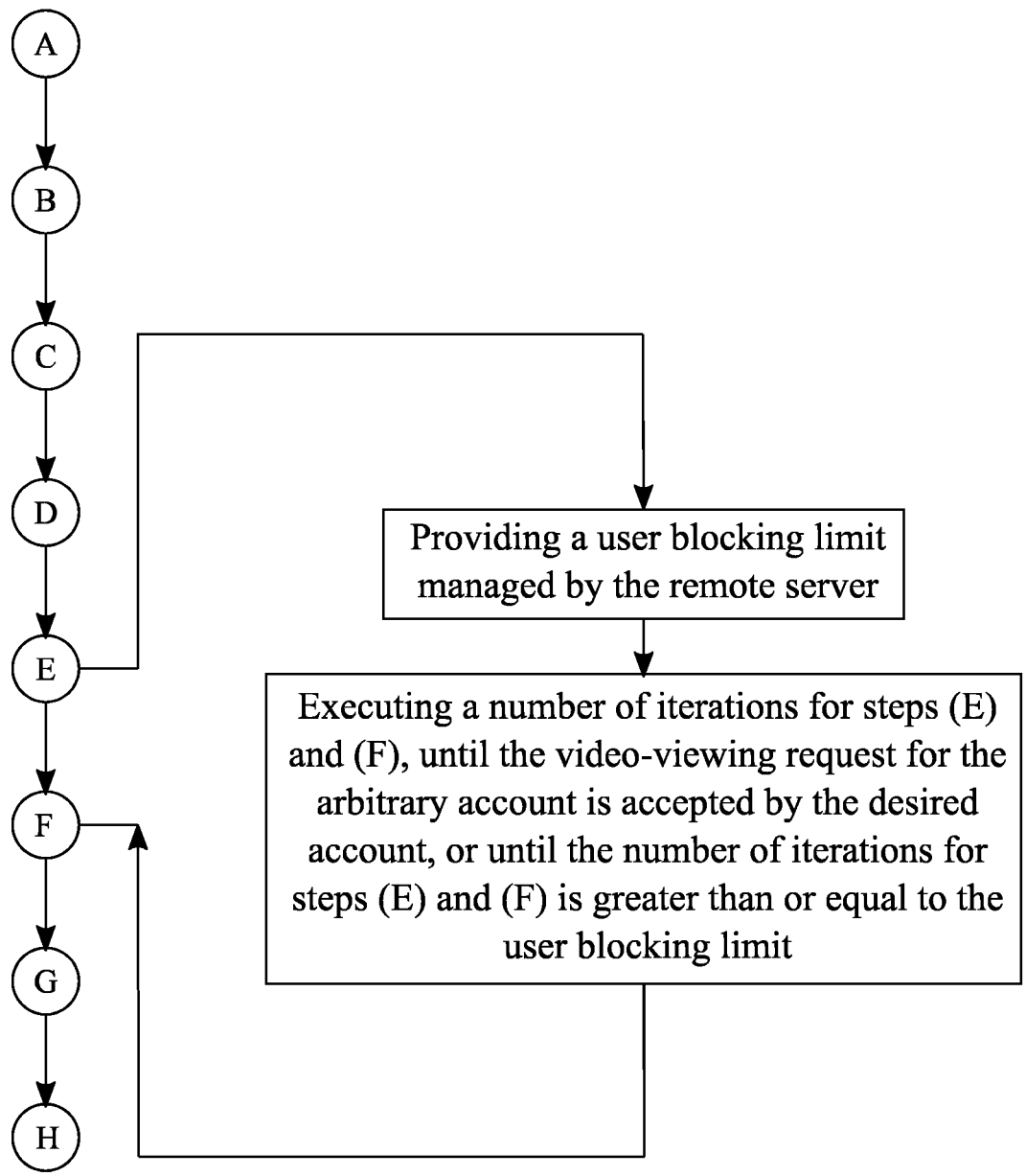
FIG. 23 is a flowchart illustrating the subprocess of blocking a user account based on a user blocking limit.

As some user accounts may not be able to or refuse to accept a denial by another user account, a user account may be blocked as a user blocking limit is managed by the remote server, as seen in FIG. 23. The user blocking limit is a threshold for a user account to send a video-viewing request to a desired account. A number of iterations for Step E through Step F is executed, until the video-viewing request for the arbitrary account is accepted by the desired account, or until the number of iterations for Step E through Step F is greater than or equal to the user blocking limit. More specifically, the arbitrary account is able to send a video-viewing request to a desired account for a specific number of times at which point the desired account may officially prevent the arbitrary account from sending a video-viewing request as well as view the dating profile of the desired account. In the preferred embodiment of the present invention, the user blocking limit is three video-viewing requests.

Although the invention has been explained in relation to its preferred embodiment, it is to be understood that many other possible modifications and variations can be made without departing from the spirit and scope of the invention as hereinafter claimed.

What is claimed is:

1. A method of dating through video profiles, the method comprising the steps of:
    (A) providing a plurality of user accounts managed by at least one remote server, wherein each user account is associated with a corresponding personal computing (PC) device, and wherein each user account includes a geospatial meeting radius, an introduction video, and a dating profile;
    (B) tracking a current location of the corresponding PC device of each user account with the remote server;
    (C) prompting each user account to view the introduction video of at least one desired account with the corresponding PC device, wherein the desired account is from the plurality of user accounts;
    (D) outputting the introduction video of the desired account with the corresponding PC device of at least one arbitrary account, if the introduction video of the desired account is selected to be viewed by the arbitrary account, and if the current location of the desired account is within the geospatial meeting radius of the arbitrary account, wherein the arbitrary account is any account from the plurality of user accounts;
    (E) prompting the arbitrary account to send a video-viewing request to the desired account with the corresponding PC device;
    (F) prompting the desired account to accept the video-viewing request for the arbitrary account with the corresponding PC device, if the video-viewing request is selected to be sent to the desired account by the arbitrary account;
    (G) outputting the introduction video of the arbitrary account with the corresponding PC device of the desired account, if the video-viewing request for the arbitrary account is accepted by the desired account; and,
    (H) executing a scheduling process for at least one live meeting between the arbitrary account and the desired account through the remote server;
        comparing the current location of each user account to the geospatial meeting radius of the arbitrary account with the remote server during step (C) in order to identify a plurality of proximal accounts from the plurality of user accounts, wherein the current location of each proximal account is within the geospatial meeting radius of the arbitrary account;
        displaying the dating profile of each proximal account with the corresponding PC device of the arbitrary account; and,
        prompting the arbitrary account to select the desired account from the plurality of proximal accounts with the corresponding PC device.

2. The method of dating through video profiles, the method as claimed as claim 1 comprising the steps of:
    providing the corresponding PC device with a camera and a microphone;
    capturing audiovisual data with the camera and the microphone of the corresponding PC device of each user account; and,
    designating the audiovisual data as the introduction video of each user account with the remote server during step (A).

3. The method of dating through video profiles, the method as claimed as claim 2 comprising the steps of:
    prompting each user account to enter at least one video edit for the audiovisual data with the corresponding PC device; and,
    applying the video edit to the introduction video of the corresponding PC device of at least one specific account, if the video edit is entered by the specific account, wherein the specific account is from the plurality of user accounts.

4. The method of dating through video profiles, the method as claimed as claim 1 comprising the steps of:
    prompting the arbitrary account to select a specific control from a plurality of media controls with the corresponding PC device; and,
    executing the specific control as the introduction video of the desired account is displayed during step (D) with the corresponding PC device of the arbitrary account.

5. The method of dating through video profiles, the method as claimed as claim 1 comprising the steps of:
    prompting the desired account to select a specific control from a plurality of media controls with the corresponding PC device; and,
    executing the specific control as the introduction video of the arbitrary video is displayed during step (G) with the corresponding PC device of the desired account.

6. The method of dating through video profiles, the method as claimed as claim 1 comprising the steps of:
    sequentially displaying the dating profile of each proximal account with the corresponding PC device of the arbitrary account; prompting the arbitrary account to select a specific account as the dating profile of the specific account is displayed with the corresponding PC device, wherein the specific account is from the plurality of user accounts; and,
    designating the specific account as the desired account with the remote server, if the specific account is selected by the arbitrary account.

7. The method of dating through video profiles, the method as claimed as claim 1 comprising the steps of:
    prompting the desired account to select either a video date or a phone date as the live meeting with the corresponding PC device during step (H);
    prompting the arbitrary account to accept the video date as the live meeting with the corresponding PC device, if the video date is selected as the live meeting by the desired account; and, executing the video date between the arbitrary account and the desired account through the remote server after step (H), if the video date is accepted as the live meeting by the arbitrary account.

8. The method of dating through video profiles, the method as claimed as claim 1 comprising the steps of:
prompting the desired account to select either a video date or a phone date as the live meeting with the corresponding PC device during step (H);
prompting the arbitrary account to accept the phone date as the live meeting with the corresponding PC device, if the phone date is selected as the live meeting by the desired account; and,
executing the phone date between the arbitrary account and the desired account through the remote server after step (H), if the phone date is accepted as the live meeting by the arbitrary account.

9. The method of dating through video profiles, the method as claimed as claim 1 comprising the steps of:
prompting the desired account to enter a date-and-time for the live meeting with the corresponding PC device during step (H);
prompting the arbitrary account to accept the date-and-time for the live meeting with the corresponding PC device, if the date-and-time for the live meeting is entered by the desired account; and,
setting a reminder notification for the live meeting at the date-and-time with the remote server, if the date-and-time for the live meeting is accepted by the arbitrary account.

10. The method of dating through video profiles, the method as claimed as claim 9 comprising the steps of:
prompting the desired account to enter a new date-and-time for the live meeting with the corresponding PC device;
prompting the arbitrary account to accept the new date-and-time for the live meeting with the corresponding PC device, if the new date-and-time for the live meeting is entered by the desired account; and,
resetting the reminder notification for the live meeting at the new date-and-time with the remote server, if the new date-and-time for the live meeting is accepted by the arbitrary account.

11. The method of dating through video profiles, the method as claimed as claim 9 comprising the steps of:
prompting the arbitrary account to enter a new date-and-time for the live meeting with the corresponding PC device;
prompting the desired account to accept the new date-and-time for the live meeting with the corresponding PC device, if the new date-and-time for the live meeting is entered by the arbitrary account; and,
resetting the reminder notification for the live meeting at the new date-and-time with the remote server, if the new date-and-time for the live meeting is accepted by the desired account.

12. The method of dating through video profiles, the method as claimed as claim 1 comprising the steps of:
providing a user blocking limit managed by the remote server; and,
executing a number of iterations for steps (E) and (F), until the video-viewing request for the arbitrary account is accepted by the desired account, or until the number of iterations for steps (E) and (F) is greater than or equal to the user blocking limit.

\* \* \* \* \*